(12) United States Patent
Yano

(10) Patent No.: US 7,526,204 B2
(45) Date of Patent: Apr. 28, 2009

(54) OPTICAL COMMUNICATION APPARATUS, OPTICAL COMMUNICATION SYSTEM AND METHOD FOR TRANSMITTING OPTICAL SIGNAL

(75) Inventor: Yutaka Yano, Tokyo (JP)

(73) Assignee: NEC Corporation, Tokyo (JP)

( * ) Notice: Subject to any disclaimer, the term of this patent is extended or adjusted under 35 U.S.C. 154(b) by 468 days.

(21) Appl. No.: 11/185,901

(22) Filed: Jul. 21, 2005

(65) Prior Publication Data

US 2006/0045532 A1   Mar. 2, 2006

(30) Foreign Application Priority Data

Jul. 28, 2004   (JP) .............................. 2004-220114

(51) Int. Cl.
*H04J 14/02* (2006.01)
*H04B 10/00* (2006.01)

(52) U.S. Cl. .............................. 398/81; 398/83; 398/159

(58) Field of Classification Search ................... 398/82, 398/83, 85, 91
See application file for complete search history.

(56) References Cited

U.S. PATENT DOCUMENTS

| 6,771,854 | B2 * | 8/2004 | Matsuoka et al. | 385/24 |
| 2002/0021862 | A1 * | 2/2002 | Zhou et al. | 385/24 |
| 2002/0101633 | A1 * | 8/2002 | Onaka et al. | 359/119 |
| 2003/0058497 | A1 * | 3/2003 | Park et al. | 359/127 |
| 2003/0206692 | A1 | 11/2003 | Matsuoka et al. | |

FOREIGN PATENT DOCUMENTS

| JP | H11-289296 | 10/1999 |
| JP | 2000-022640 | 1/2000 |
| JP | 2000-357994 | 12/2000 |
| JP | 2001-186084 | 7/2001 |
| JP | 2002-152132 | 5/2002 |
| JP | 2003-258726 | 9/2003 |
| JP | 2003-318825 | 11/2003 |

OTHER PUBLICATIONS

Product features for JDS Uniphase Wavelength Blocker retrieved from http://www.jdsu.com, Jul. 20, 2004.

* cited by examiner

*Primary Examiner*—Dalzid Singh
(74) *Attorney, Agent, or Firm*—Dickstein Shapiro LLP

(57) ABSTRACT

The present invention relates to optical communication apparatuses such as OADM node, or OXC node. A receiving dispersion compensating module adjusts the accumulated dispersion of a wavelength-division-multiplexed optical signal such that the accumulated dispersion has an optimum value at a receiver for receiving optical signals in respective wavelength channels which are dropped from the wavelength-division-multiplexed optical signal. An auxiliary dispersion compensating module is provided in a path for an added wavelength group. The auxiliary dispersion compensating module applies the same value of dispersion as the accumulated dispersion adjusted by the receiving dispersion compensating module, to a wavelength-division-multiplexed optical signal in the added wavelength group. Therefore, the accumulated dispersion of a dropped wavelength group has an optimum value, and the accumulated dispersion of a through wavelength group and the accumulated dispersion of the added wavelength group are equalized to each other in a multiplexer.

17 Claims, 22 Drawing Sheets parallel type series type

WB type parallel type (with SW)

OPTICAL COMMUNICATION APPARATUS, OPTICAL COMMUNICATION SYSTEM AND METHOD FOR TRANSMITTING OPTICAL SIGNAL

BACKGROUND OF THE INVENTION

1. Field of the Invention

The present invention relates to an optical communication system for transmitting a wavelength-division-multiplexed optical signal comprising a plurality of multiplexed optical signals having respective different wavelengths according to the wavelength division multiplexing technology, and more particularly to an optical communication apparatus, an optical communication system, and an optical transport method for an OADM (Optical Add-Drop Multiplexing) node which adds and drops an optical signal having a desired wavelength to and from a wavelength-division-multiplexed optical signal comprising a plurality of multiplexed optical signals having respective different wavelengths, and passes such a wavelength-division-multiplexed optical signal, and an OXC (Optical cross Connect) node which adds and drops an optical signal having a desired wavelength to and from a wavelength-division-multiplexed optical signal comprising a plurality of multiplexed optical signals having respective different wavelengths, and switches between paths for outputting optical signals having respective different wavelengths.

2. Description of the Related Art

<Wavelength Division Multiplexing Optical Communication System>

Optical communication systems based on the WDM (Wavelength Division Multiplexing) technology have been in growing usage in order to construct a backbone network which is capable of accommodating vast data traffic, typified by the Internet.

Such an optical communication system comprises a transmitting terminal station, repeating stations, a receiving terminal station, and an optical fiber transport path interconnecting those stations. The transmitting terminal station multiplexes a plurality of optical signals in respective channels into a wavelength-division-multiplexed signal and outputs the wavelength-division-multiplexed signal to the optical fiber transport path. The repeating station is positioned on the optical fiber transport path and amplifies the wavelength-division-multiplexed signal and compensates for chromatic dispersions. The receiving terminal station demultiplexes the wavelength-division-multiplexed signal that is input from the optical fiber transport path via the repeating station into a plurality of optical signals in respective channels, and receives those optical signals.

One conventional optical communication system is illustrated in FIG. 1 of the accompanying drawings. In FIG. 1, a transmitting terminal station comprises a plurality of transmitters (Tx) $260_1$ through $260_N$, multiplexer (MUX) 240, and optical amplifier 210. A receiving terminal station comprises a plurality of receivers (Rx) $270_1$ through $270_N$, demultiplexer (DMUX) 250, and optical amplifier 230. Optical amplifier 220 functions as a repeating station. Optical amplifiers 210, 220, 230 are combined respectively with DCMs (Dispersion Compensating Modules) 211, 221, 231 for compensating for a chromatic dispersion caused by an optical fiber transport path.

Though only one repeating station is illustrated in FIG. 1 for the sake of brevity, the optical communication system actually has a plurality of repeating stations depending on the length of the optical fiber transport path.

In the transmitting terminal station, transmitters (Tx) $260_1$ through $260_N$ generate optical signals having respective wavelengths $\lambda_1, \lambda_2, \ldots, \lambda_N$, and multiplexer 240 multiplexes the optical signals into a wavelength-division-multiplexed signal. Optical amplifier 210 amplifies the wavelength-division-multiplexed signal and outputs the amplified wavelength-division-multiplexed signal to the optical fiber transport path. When the wavelength-division-multiplexed signal is amplified by optical amplifier 210, the wavelength-division-multiplexed signal may be compensated for a chromatic dispersion.

The wavelength-division-multiplexed signal output to the optical fiber transport path is transmitted to optical amplifier 220 as the repeating station. After the wavelength-division-multiplexed signal is amplified by optical amplifier 220, the wavelength-division-multiplexed signal is transmitted over the optical fiber transport path to the receiving terminal station. When the wavelength-division-multiplexed signal is amplified by optical amplifier 220, the wavelength-division-multiplexed signal is compensated by DCM 221 for a chromatic dispersion which has occurred in the optical fiber transport path between the transmitting terminal station and the repeating station. In the receiving terminal station, the wavelength-division-multiplexed signal transmitted from the repeating station over the optical fiber transport path is amplified by optical amplifier 230, and then demultiplexed by demultiplexer 250 into optical signals having respective wavelengths $\lambda_1, \lambda_2, \ldots, \lambda_N$, which are output respectively to receivers $270_1$ through $270_N$.

<Dispersion Compensation>

Dispersion compensation that is performed by the above optical communication system will be described in detail below.

The optical fiber transport path has such properties that it causes chromatic dispersion (hereinafter also referred to as "dispersion") which tends to be applied to a signal that is passing through the optical fiber transport path. When the signal suffers accumulated dispersion, different frequency components of the signal are delayed by different amount, resulting in a serious signal waveform distortion. If the accumulated dispersion is too large, then the signal cannot properly received by the receiving terminal station.

Therefore, it is necessary to perform dispersion compensation by canceling a chromatic dispersion caused by the optical fiber transport path with a dispersion having a reverse sign. Different signs of dispersion are differentiated by "abnormal dispersion", and "normal dispersion". It is often to indicate abnormal dispersion with a sign of "+" and normal dispersion with a sign of "−". These signs will be used in this specification. However, care should be taken because the signs may be used the other way around according to some standards. Dispersion has a unit of "ps/nm".

Dispersion in an optical fiber transport path is compensated for by a dispersion compensating module (DCM). DCMs that are generally used today are in the form of a dispersion compensating fiber.

It is necessary to pay attention to two different ways of expressing a value of dispersion. According to one practice, the capability of a DCM is expressed as "DCM of −500 ps/nm", for example. The phrase "−500 ps/nm" represents that the DCM is capable applying a dispersion of −500 ps/nm to a signal. According to the other practice, a signal with a dispersion of +500 ps/nm applied thereto is referred to as a signal having dispersion of +500 ps/nm. This expression is an idiomatic expression and should more accurately mean "a signal suffering an accumulated dispersion of +500 ps/nm". A value of dispersion that a signal is suffering represents an accumulated value of dispersion that a medium has caused which the signal has been propagated through from the time when the signal started to be transmitted and the accumulation was nil.

<OADM Node>

Initially, optical communication systems were introduced because they are capable of transmitting optical signals over long distances. First, two components of a communication system, i.e., links and nodes, were constructed as optical devices. Thereafter, as the transmission capacity per link greatly increased according to the wavelength division multiplexing technology, the cost of a process of converting all wavelength-division-multiplexed signals into electric signals at an input section of each node, editing the electric signals, and then generating and outputting all wavelength-division-multiplexed signals again become burdensome. There was a demand for processing optical signals as they are in each node.

OADM (Optical Add-Drop Multiplexing) nodes were put to practical use. An OADM node is a node having functions to extract and receive certain wavelength channels from a wavelength-division-multiplexed optical signal and also to add and transmit certain wavelength channels to a wavelength-division-multiplexed optical signal. The OADM node allows wavelength channels passing therethrough to be processed at a greatly reduced cost, and makes the optical communication system economical.

A conventional optical communication system with an ODAM node is shown in FIG. 2 of the accompanying drawings. The optical communication system shown in FIG. 2 is similar to the optical communication system shown in FIG. 1 except that it has ODAM node 300 instead of the repeating station.

The OADM node is supplied with a single wavelength-division-multiplexed optical signal having a plurality of multiplexed wavelength channels, drops certain wavelength channels from the wavelength-division-multiplexed optical signal, adds certain wavelength channels to the wavelength-division-multiplexed optical signal, and outputs a single wavelength-division-multiplexed optical signal.

As shown in FIG. 2, OADM node 300 drops wavelength channels having wavelengths $\lambda_1$, $\lambda_2$, $\lambda_3$ from a wavelength-division-multiplexed optical signal transmitted through an optical fiber transport path, outputs the dropped wavelength channels to receiver 70, and adds wavelength channels having wavelengths $\lambda_2$, $\lambda_3$ from transmitter 80 to the wavelength-division-multiplexed optical signal. Actually, the optical communication system has a plurality of receivers which are all denoted by 70 and a plurality of transmitters which are all denoted by 80.

<Conventional OADM Node Arrangements>

Heretofore, there are available several arrangements for use as OADM node 300 shown in FIG. 2. Such conventional arrangements for use as OADM node 300 will be described below.

FIG. 3 of the accompanying drawings shows a parallel OADM node for demultiplexing a supplied wavelength-division-multiplexed optical signal into a plurality of optical signals, processing the optical signals, and then multiplexing the processed optical signals into a wavelength-division-multiplexed optical signal. The OADM node comprises receiving amplifier 10, transmitting amplifier 20, demultiplexer 30, multiplexer 40, receiver 70, and transmitter 80. Receiving amplifier 10 is combined with receiving dispersion compensating module (receiving DCM) 11, and transmitting amplifier 20 is combined with transmitting dispersion compensating module (transmitting DCM) 21.

Receiving DCM 11 compensates for a dispersion of the wavelength-division-multiplexed optical signal supplied to receiving amplifier 10, and transmitting DCM 21 compensates for a dispersion of the wavelength-division-multiplexed optical signal output from transmitting amplifier 20.

DMUX 30 demultiplexes the wavelength-division-multiplexed optical signal from receiving amplifier 10 into optical signals having respective wavelengths $\lambda_1$, $\lambda_2$, $\lambda_3$, ..., $\lambda_N$. In FIG. 3, optical signals having respective wavelengths $\lambda_1$, $\lambda_2$, $\lambda_3$ are dropped from DMUX 30, and optical signals having respective wavelengths $\lambda_4$ through $\lambda_N$ are output as through signals from DMUX 30 to MUX 40. The dropped optical signals having respective wavelengths $\lambda_1$, $\lambda_2$, $\lambda_3$ are output to receiver 70.

Optical signals having respective wavelengths $\lambda_2$, $\lambda_3$ are added from transmitter 80 to MUX 40.

MUX 40 multiplexes the optical signals having respective wavelengths $\lambda_4$ through $\lambda_N$ from DMUX 30 and the optical signals having respective wavelengths $\lambda_2$, $\lambda_3$ from transmitter 80 into a wavelength-division-multiplexed optical signal, and outputs the wavelength-division-multiplexed optical signal to transmitting amplifier 20.

The arrangement shown in FIG. 3 is identical to a pair of multipliers and demultiplexer, connected back to back, each used in a terminal such as a receiving terminal station or a transmitting terminal station, and can share parts with terminals. MUX 30 and DMUX 40 may employ AWGs (Arrayed Waveguide Gratings) that have widely been used in the art and are inexpensive to manufacture. The OADM node shown in FIG. 3 is advantageous in that the through signals are not adversely affected when add/drop settings are changed.

FIG. 4 of the accompanying drawings shows a series OADM node which employs optical filters 141, 142 for acting on wavelengths that are to be added and dropped.

Optical filter 141 separates an optical signal having wavelength $\lambda_1$ from a wavelength-division-multiplexed optical signal, and optical filter 142 separates an optical signal having wavelength $\lambda_2$ from a wavelength-division-multiplexed optical signal and combines an optical signal having wavelength $\lambda_2$ with the wavelength-division-multiplexed optical signal.

The arrangement shown in FIG. 4 is advantageous in that it is economical if the ratio of the number of wavelength channels that are added and dropped to the number of all wavelength channels is small. However, the arrangement shown in FIG. 4 is disadvantageous in that when add/drop settings are changed, the optical filters need to be taken into and out of working positions, and instantaneously interrupt all the through signals. Therefore, the arrangement shown in FIG. 4 is not suitable for use in OADM applications for dynamically changing add/drop settings.

FIG. 5 of the accompanying drawings shows a new device which has been introduced into the art in recent years, the device employing a wavelength blocker (WB).

The WB is a device capable of passing channels of certain wavelengths as through signals, of a supplied wavelength-division-multiplexed optical signal. Specifically, a WB manufactured by JDS Uniphase Corporation may be used.

The conventional OADM node shown in FIG. 5 has dividing coupler 51, wavelength blocker (WB) 110, and combining coupler 50 which are connected in series between receiving amplifier 10 and transmitting amplifier 20. DMUX 30 is connected to dividing coupler 51, and MUX 40 is connected to combining coupler 50. Dividing coupler 51 divides a wavelength-division-multiplexed optical signal output from receiving amplifier 10 and outputs the divided wavelengthdivision-multiplexed optical signal to DMUX 30, and combining coupler 50 combines an optical signal from WB 110 and an optical signal from MUX 40 with each other, and outputs a combined optical signal to transmitting amplifier 20.

WB 110 is a reconfigurable optical filter for selectively passing and blocking wavelength channels, and does not adversely affect through signals when it is reconfigured. WB 110 passes only wavelength channels as through signals of a wavelength-division-multiplexed optical signal after its dispersion has been adjusted by receiving dispersion compensating module 11. In FIG. 5, WB 110 is configured to block optical signals having respective wavelengths $\lambda_1$, $\lambda_2$, $\lambda_3$ against passing therethrough.

With the conventional OADM node shown in FIG. 5, optical signals having respective wavelengths $\lambda_1$, $\lambda_2$, $\lambda_3$ are demultiplexed from the wavelength-division-multiplexed optical signal by DMUX 30, and output to receiver 70. However, optical signals having respective wavelengths $\lambda_4$ through $\lambda_N$ pass as through signals through WB 110, and are output to transmitting amplifier 20.

The arrangement of the OADM node shown in FIG. 5 is similar to the parallel OADM node shown in FIG. 3, except through signals are differently handled. In the parallel OADM node, all signals including dropped signals and through signals are demultiplexed. In the OADM node having the WB, through signals having respective wavelengths $\lambda_4$ through $\lambda_N$ are not demultiplexed. Therefore, even if OADM nodes with WBs are connected in multiple stages, the through signals are prevented from being degraded by a narrower spectral range when the optical signal passes through multiple optical fibers of DMUXs 30.

FIG. 6 of the accompanying drawings shows an OADM node which is basically the same as the OADM node shown in FIG. 3, except that optical 2×2 switches 130 are added for automatic configuration. With the OADM node shown in FIG. 3, add/drop/through settings are made entirely through optical patch code connections that are manually set up to connect DMUX 30 and MUX 40. Though the optical patch code connections are best from the standpoint of structural costs, they are costly in terms of man-hours, tend to suffer setting errors if the number of wavelengths handled increases, and are not freely capable of selecting any desired wavelengths to be added and dropped. The OADM node shown in FIG. 6, the 2×2 switches 130 are associated with the respective wavelengths for automatically and remotely setting at least whether optical signals in the respective channels are to pass through or not.

<Optimum Value of Accumulated Dispersion of Received Signal>

In each of the above OADM nodes, receiving DCM 11 and transmitting DCM 21 are used to compensate for chromatic dispersion caused by an optical fiber transport path to reduce a value of accumulated dispersion. Generally, each node is configured to compensate for accumulated dispersion caused by an optical fiber transport path to eliminate the accumulated dispersion. Therefore, when a transmitted optical signal is received by the receiver, the received optical signal is supported to have no accumulated dispersion. However, it is known in the art that when a transmitted optical signal is received by the receiver, an optimum value of accumulated dispersion of the signal is often not zero. The optimum value of accumulated dispersion unit a minimum bit error rate. Consequently, the optimum value of accumulated dispersion represents a value of accumulated dispersion which makes the bit error rate at the receiver minimum. If complete dispersion compensation is performed to eliminate accumulated dispersion, then the waveform of the received optical signal should be identical to the waveform of the transmitted optical signal. However, the bit error rate is further improved by imparting dispersion. This phenomenon occurs because of phase modulation accompanied by intensity modulation that is mainly called "chirp". In the presence of chirp, optical pulses are compressed by dispersion accumulation, improving the receiver sensitivity.

An optimum value of accumulated dispersion which is not zero is disclosed in Japanese patent No. 3337980, for example. FIGS. 10 and 11 of Japanese patent No. 3337980 indicate that there are cases wherein the penalty of the receiver sensitivity is lower when the accumulated dispersion is not zero(optimum) than when the accumulated dispersion is zero. In particular, FIG. 11 of Japanese patent No. 3337980 shows that accumulated dispersion is present across zero, the optimum value of accumulated dispersion is not zero in most cases, and the optimum value of accumulated dispersion changes depending on how chirp is given in the modulator.

Chirp which gives rise to the above phenomenon is a kind of phase modulation. Types of phase modulation include the chirp which is given by the nature of the transmitter from the time when the optical signal is transmitted, and also nonlinear phase modulation which is given by a optical nonlinear effect in the optical fiber transport path. The optical nonlinear effect refers to a phenomenon in which the refractive index of an optical fiber changes depending on the instantaneous optical power. The optical signal transmitted through the optical fiber is subject to nonlinear phase modulation due to the optical nonlinear effect. Optical nonlinear effects in a wavelength division multiplex system include SPM (Self Phase Modulation) caused in own channels and XPM (Cross Phase Modulation) caused by other propagating channels in parallel. Because these optical nonlinear effects take place when an optical signal enters from an optical amplifier into an optical fiber, an accumulated amount of nonlinear phase modulation differs depending on the launched power into the optical fiber and the number of repeating optical amplifiers, etc.

The above phenomenon is also revealed in Japanese laid-open patent publication No. 2003-318825. FIG. 2 of Japanese laid-open patent publication No. 2003-318825 shows an optimum value of accumulated dispersion represented by a line indicated as optimum. FIG. 2 shows that there are cases wherein the optimum value of accumulated dispersion is not zero, the optimum value of accumulated dispersion changes with the transmission distance, and the optimum value of accumulated dispersion also changes depending on the transmission process.

FIG. 7 of the accompanying drawings shows measured data of a bit error rate with respect to accumulated dispersion when an optical signal is received by a receiving terminal of a wavelength division multiplexing optical communication system. According to the measured data shown in FIG. 7, the error code ratio is best, i.e., minimum, when accumulated dispersion has a value of about +300 ps/nm. Therefore, the optimum value of accumulated dispersion is +300 ps/nm.

As the accumulated dispersion, i.e., the absolute value thereof, increases, the bit error rate becomes worse, and hence the optimum value of accumulated dispersion is not too large. Generally, the optimum value of accumulated dispersion falls in a certain range across 0 ps/nm.

For example, if the transmission rate is 10 Gbps and the code format is NRZ (Non-Return to Zero), then the optimum value of accumulated dispersion at the time the optical signal is received falls in the following range:

|Dispersion range containing optimum value of accumulated dispersion|≦1000 [ps/nm]

If the code format is RZ (Return to Zero), then the dispersion range becomes about half, as indicated below:

|Dispersion range containing optimum value of accumulated dispersion|≦500 [ps/nm]

As described above, an optimum value of accumulated dispersion of the signal when it is received is often not zero. The value of accumulated dispersion of the signal when it is received can easily be tuned to an optimum value in a simple receiving terminal station, but cannot in an OADM station because of structural limitations thereof.

Specifically, problems which occur with different values of dispersion at transmitting and receiving stations in a conventional system will be described below with reference to FIG. 8 of the accompanying drawings. It is assumed that the value of dispersion of a received optical signal is adjusted to +300 ps/nm. The value of dispersion can be adjusted using only receiving DCM 11. As a result, though the optical signal can be received with an optimum value of accumulated dispersion, through signals also suffer accumulated dispersion having a value of +300 ps/nm. On the other hand, transmitted signals, i.e., added signals, output from transmitter 80 have accumulated dispersion having a value of 0 ps/nm. When the through signals and the added signals are multiplexed by MUX 40, a wavelength-division-multiplexed optical signal output from MUX 40 includes a mixture of signals having accumulated dispersion of +300 ps/nm and signals having accumulated dispersion of 0 ps/nm. If signals having such different values of accumulated dispersion are produced in a plurality of OADM nodes, then it is difficult to manage the values of accumulated dispersion.

Consequently, it has heretofore been necessary to keep the accumulated dispersion nearly nil when the optical signal is received in the OADM nodes, because the dispersion of the transmitted signals and the dispersion of the through signals are same, so that the transmitted wavelength-division-multiplexed optical signal has a single value of dispersion. However, this practice faces a dilemma in that since the value of accumulated dispersion at the time the signal is received is not optimum, the transmitted signal cannot have its best performance unlike the data shown in FIG. 7, and a margin for dispersion variations is reduced.

<Conventional Dispersion Adjustment Process and Problems>

A straightforward solution to the above problem is provided by arrangements shown in FIGS. 9 and 10 of the accompanying drawings. In FIG. 9, individual auxiliary DCMs 60 are inserted for respective channels that have been demultiplexed. In FIG. 10, individual auxiliary DCMs 60 are inserted for respective channels that are to be multiplexed.

The arrangement shown in FIG. 9 is advantageous in that it offers a high level of adjustment freedom because the dispersion can be adjusted in each wavelength channel, and is put to practical use in a submarine transmission system which requires such adjustments. However, it is generally too costly to provide as many auxiliary DCMs 60 as the number of wavelengths involved, and the advantage of being capable of fine adjustment is not universal because it poses undue operational costs to optimize the fine adjustment capability to every application. Therefore, there is a demand for a solution without using individual auxiliary DCMs.

Another solution is disclosed in Japanese laid-open patent publication No. 2003-318825 referred to above. The disclosed solution employs an algorithm for seeking a combination of optimum values for holding accumulated dispersion within an allowable range for any wavelength path groups.

The algorithmic process is advantageous in that it requires no special hardware, but is disadvantageous in that as the number of wavelength paths increases, a process of finding a combination of optimum dispersion values compensation is practically infeasible, and it is difficult to handle a change in wavelength path settings because the addition of a new wavelength path needs the amount of dispersion compensation to be changed for the entire system.

DCMs that are generally used at present have a fixed amount of compensation. Therefore, if the amount of compensation is changed, then DCMs need to be replaced. Replacing a DCM requires a temporary circuit disconnection and results in an added cost due to the addition of a new DCM to replace the DCM. It is therefore desirable to keep the amount of dispersion compensation unchanged even if wavelength path settings are changed.

OXC nodes, which are an optical communication apparatus other than the OADM nodes, suffer the same problems as the OADM nodes described above because if accumulated dispersion of an optical signal when the optical signal is received is to be set to an optimum value, then an auxiliary DCM needs to be provided for each wavelength.

SUMMARY OF THE INVENTION

It is an object of the present invention to provide an optical communication apparatus, an optical communication system, and an optical transport method which require no auxiliary DCM to be provided for each wavelength, do not need to change an amount of dispersion compensation even when a new wavelength path is added, and are capable of achieving best signal transmission performance by setting accumulated dispersion of an optical signal when the optical signal is received to an optimum value.

To achieve the above object, there is provided in accordance with the present invention an optical communication apparatus for adding and dropping an optical signal having a given wavelength to and from a wavelength-division-multiplexed optical signal comprising a plurality of multiplexed optical signals having respective different wavelengths, and passing a wavelength-division-multiplexed optical signal, comprising a receiving dispersion compensating module for adjusting the accumulated dispersion of the wavelength-division-multiplexed signal such that the accumulated dispersion has an optimum value at a receiver for receiving optical signals in respective wavelength channels which are dropped from the wavelength-division-multiplexed optical signal, a demultiplexing unit for demultiplexing the wavelength-division-multiplexed optical signal whose accumulated dispersion has been adjusted by the receiving dispersion compensating module, into a wavelength-division-multiplexed optical signal in a through wavelength group to pass through the optical communication apparatus and a wavelength-division-multiplexed optical signal in a dropped wavelength group to be dropped from the optical communication apparatus, an auxiliary dispersion compensating module for applying the same value of dispersion as the value of accumulated dispersion adjusted by the receiving dispersion compensating module, to a wavelength-division-multiplexed optical signal in an added wavelength group representative of signals to be added, and a multiplexing unit for combining the wavelength-division-multiplexed optical signal in the through wavelength group and the wavelength-division-multiplexed optical signal in the added wavelength group whose accumulated dispersion has been adjusted by the auxiliary dispersion compensating module, into an output optical signal.

With the above arrangement, the receiving dispersion compensating module adjusts the accumulated dispersion of the wavelength-division-multiplexed signal such that the accumulated dispersion has an optimum value at a receiver for receiving optical signals in respective wavelength channels which are dropped from the wavelength-division-multiplexed optical signal. The auxiliary dispersion compensating module is provided in a path for the added wavelength group. The auxiliary dispersion compensating module applies the same value of dispersion as the value of accumulated dispersion adjusted by the receiving dispersion compensating module, to the wavelength-division-multiplexed optical signal in the added wavelength group. Therefore, the accumulated dispersion of the dropped wavelength group has an optimum value, and the accumulated dispersion of the through wavelength group and the accumulated dispersion of the added wavelength group are equalized to each other in the multiplexing unit.

According to the present invention, there is also provided an optical communication apparatus for adding and dropping an optical signal having a given wavelength to and from a wavelength-division-multiplexed optical signal comprising a plurality of multiplexed optical signals having respective different wavelengths, and passing a wavelength-division-multiplexed optical signal, comprising a receiving dispersion compensating module for adjusting the accumulated dispersion of the wavelength-division-multiplexed signal such that the accumulated dispersion has an optimum value at a receiver for receiving optical signals in respective wavelength channels which are dropped from the wavelength-division-multiplexed optical signal, a demultiplexing unit for demultiplexing the wavelength-division-multiplexed optical signal whose accumulated dispersion has been adjusted by the receiving dispersion compensating module, into a wavelength-division-multiplexed optical signal in a through wavelength group to pass through the optical communication apparatus and a wavelength-division-multiplexed optical signal in a dropped wavelength group to be dropped from the optical communication apparatus, an auxiliary dispersion compensating module for adjusting the accumulated dispersion of the wavelength-division-multiplexed optical signal in the through wavelength group by canceling out the value of accumulated dispersion adjusted by the receiving dispersion compensating module, and a multiplexing unit for combining the wavelength-division-multiplexed optical signal in the through wavelength group whose accumulated dispersion has been adjusted by the auxiliary dispersion compensating module and a wavelength-division-multiplexed optical signal in an added wavelength group representative of signals to be added, into an output optical signal.

With the above arrangement, the receiving dispersion compensating module adjusts the accumulated dispersion of the wavelength-division-multiplexed signal such that the accumulated dispersion has an optimum value at a receiver for receiving optical signals in respective wavelength channels which are dropped from the wavelength-division-multiplexed optical signal. The auxiliary dispersion compensating module is provided in a path for the through wavelength group. The auxiliary dispersion compensating module adjusts the accumulated dispersion of the wavelength-division-multiplexed optical signal in the through wavelength group by canceling out the accumulated dispersion adjusted by the receiving dispersion compensating module. Therefore, the accumulated dispersion of the dropped wavelength group has an optimum value, the accumulated dispersion of the wavelength-division-multiplexed optical signal in the through wavelength group and the accumulated dispersion of the wavelength-division-multiplexed optical signal in the added wavelength group are eliminated, and the accumulated dispersion of the through wavelength group and the accumulated dispersion of the added wavelength group are equalized to each other in the multiplexing unit.

According to the present invention, there is further provided an optical communication apparatus for adding and dropping an optical signal having a given wavelength to and from a wavelength-division-multiplexed optical signal comprising a plurality of multiplexed optical signals having respective different wavelengths, and passing a wavelength-division-multiplexed optical signal, comprising a receiving dispersion compensating module for adjusting the accumulated dispersion of the wavelength-division-multiplexed signal such that the accumulated dispersion has a value of zero, a demultiplexing unit for demultiplexing the wavelength-division-multiplexed optical signal whose accumulated dispersion has been adjusted by the receiving dispersion compensating module, into a wavelength-division-multiplexed optical signal in a through wavelength group to pass through the optical communication apparatus and a wavelength-division-multiplexed optical signal in a dropped wavelength group to be dropped from the optical communication apparatus, an auxiliary dispersion compensating module for adjusting the accumulated dispersion of the wavelength-division-multiplexed optical signal in the dropped wavelength group such that the accumulated dispersion has an optimum value at a receiver for receiving optical signals in respective wavelength channels which are dropped from the wavelength-division-multiplexed optical signal, and a multiplexing unit for combining the wavelength-division-multiplexed optical signal in the through wavelength group and a wavelength-division-multiplexed optical signal in an added wavelength group representative of signals to be added, into an output optical signal.

With the above arrangement, the receiving dispersion compensating module adjusts the accumulated dispersion of the wavelength-division-multiplexed signal supplied as an input optical signal such that the accumulated dispersion has a value of zero. The auxiliary dispersion compensating module is provided in a path for the dropped wavelength group. The auxiliary dispersion compensating module adjusts the accumulated dispersion of the wavelength-division-multiplexed optical signal in the dropped wavelength group such that the accumulated dispersion has an optimum value at a receiver for receiving optical signals in respective wavelength channels which are dropped from the wavelength-division-multiplexed optical signal. Therefore, the accumulated dispersion of the dropped wavelength group has an optimum value, the accumulated dispersion of the wavelength-division-multiplexed optical signal in the through wavelength group and the accumulated dispersion of the wavelength-division-multiplexed optical signal in the added wavelength group are eliminated, and the accumulated dispersion of the through wavelength group and the accumulated dispersion of the added wavelength group are equalized to each other in the multiplexing unit.

The optical communication apparatus may further include a plurality of receivers for receiving the respective optical signals in the respective wavelength channels which are dropped from the wavelength-division-multiplexed optical signal, and a plurality of transmitters for outputting the signals to be added.

The optimum value of accumulated dispersion may be a value for minimizing a bit error rate at the time the wavelength-division-multiplexed optical signal is received, or may be a value other than zero.

The above and other objects, features, and advantages of the present invention will become apparent from the following description with reference to the accompanying drawings which illustrate examples of the present invention.

DETAILED DESCRIPTION OF THE PREFERRED EMBODIMENTS

Figure 1:
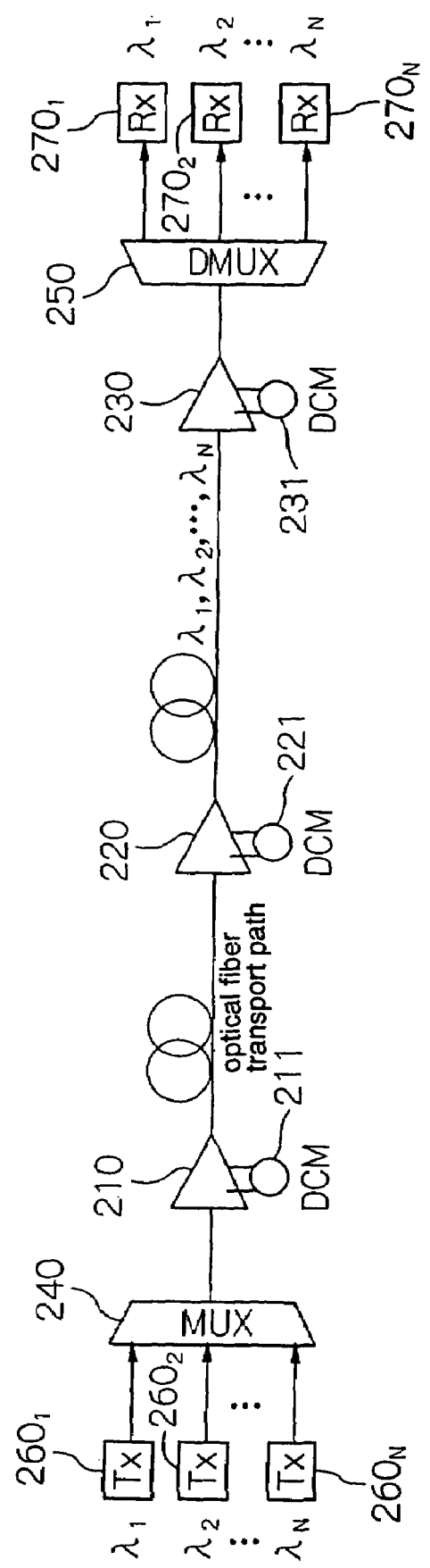
FIG. 1 is a block diagram of a general conventional optical communication system.
Figure 2:
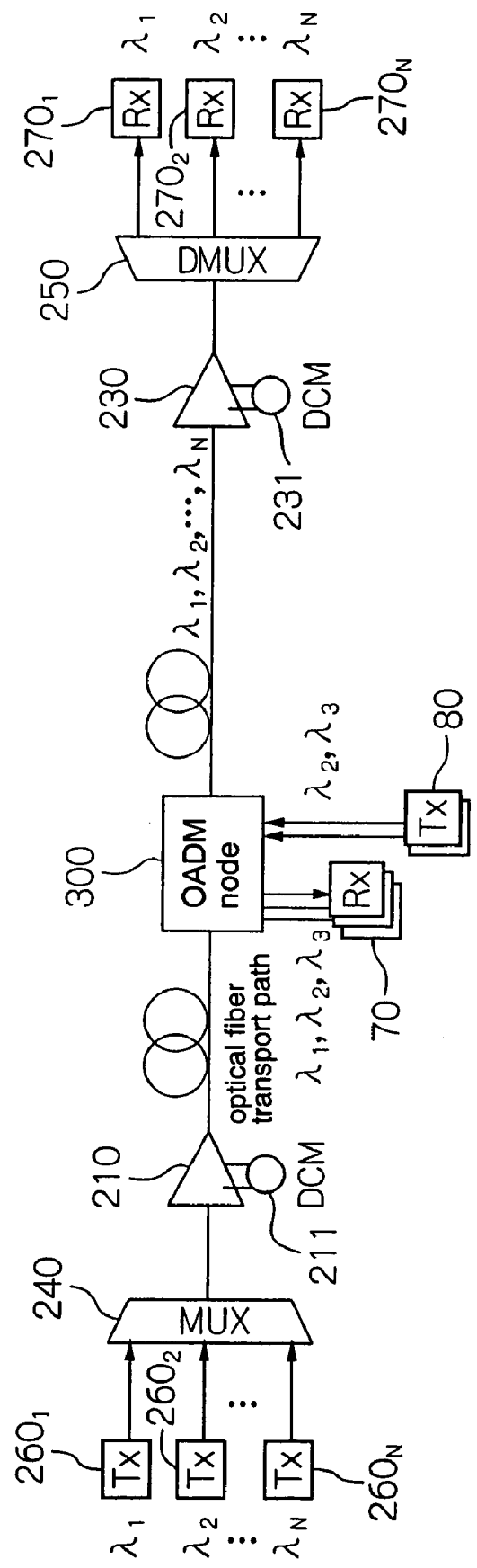
FIG. 2 is a block diagram of a conventional optical communication system having an ODAM node.
Figure 3:
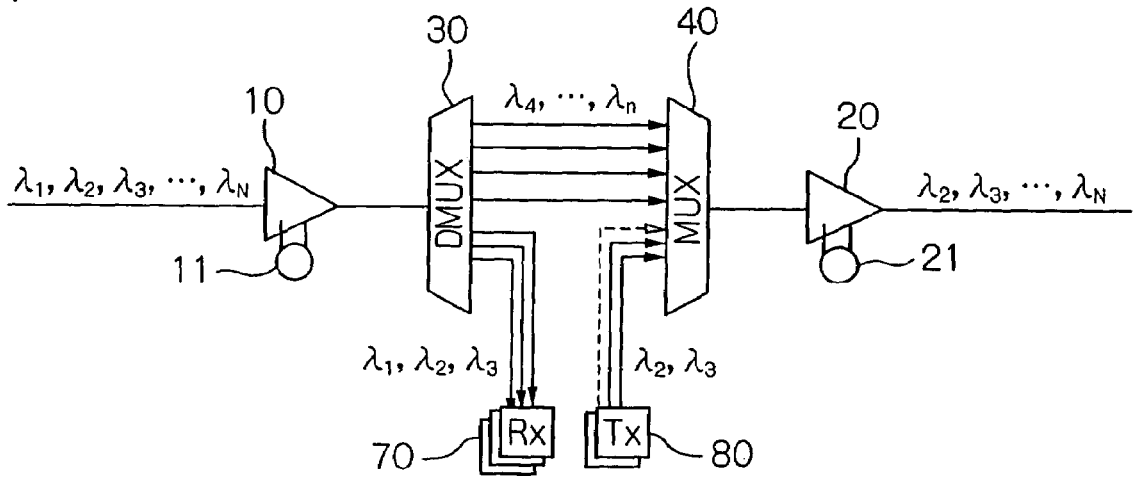
FIG. 3 is a block diagram of a conventional parallel OADM node.
Figure 4:
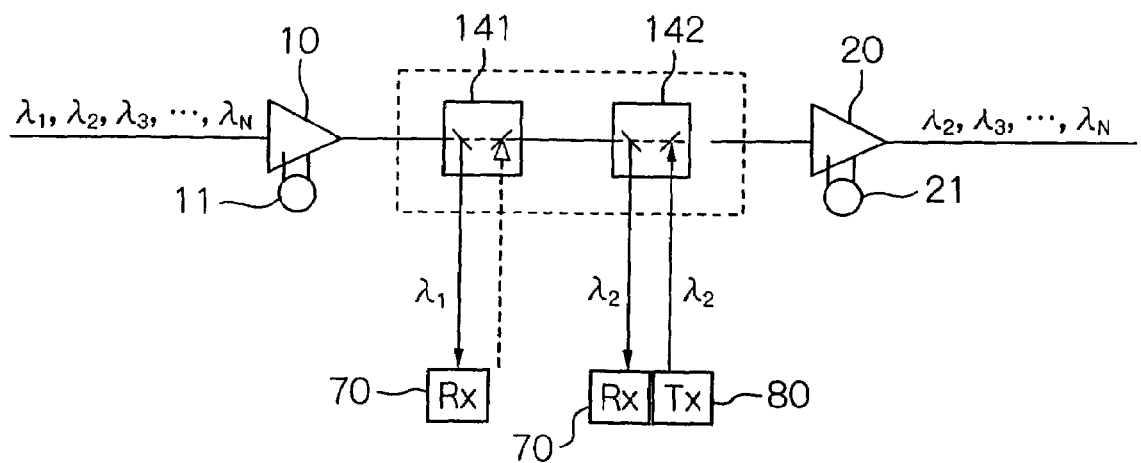
FIG. 4 is a block diagram of a conventional series OADM node.
Figure 11:
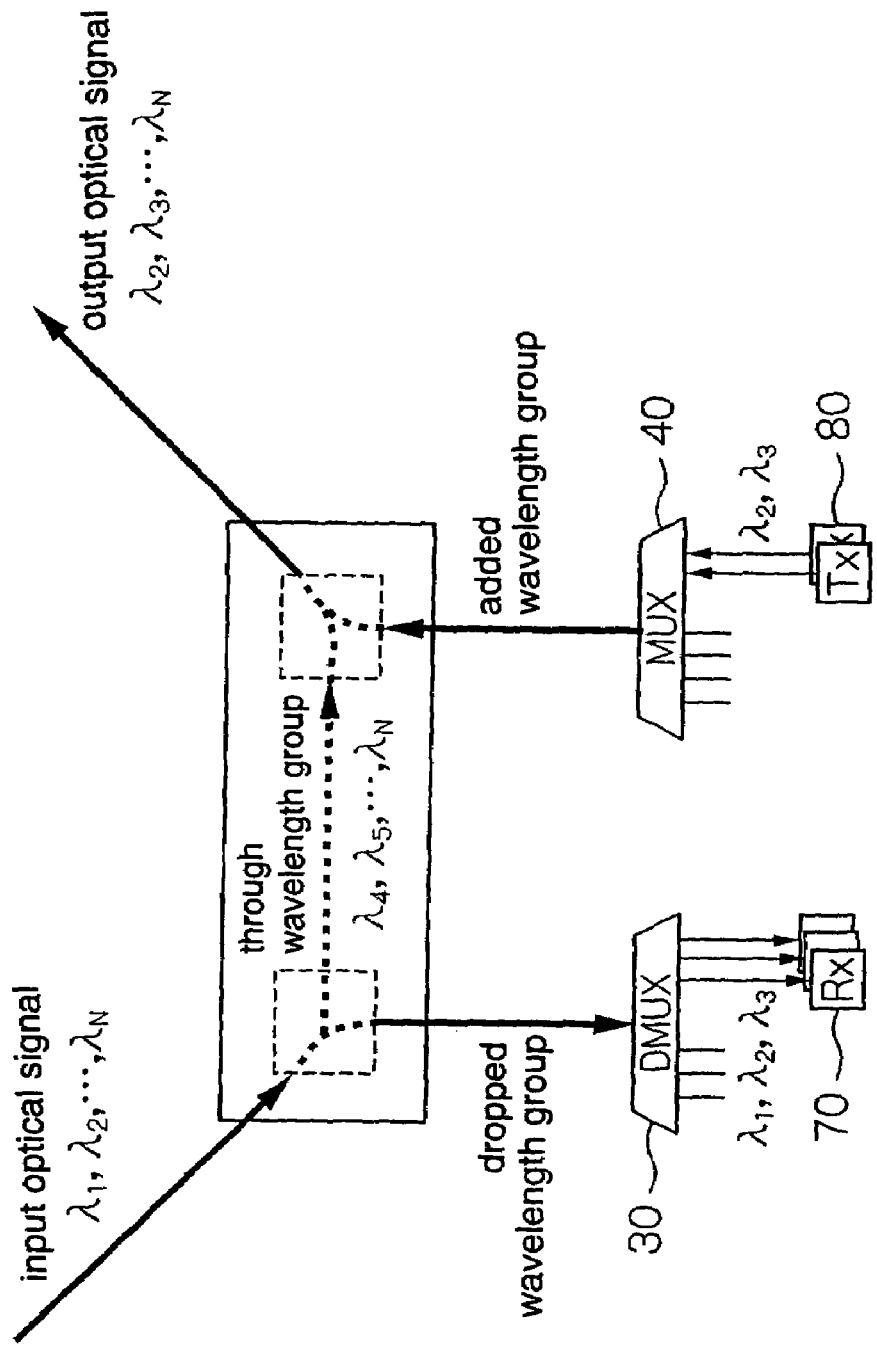
FIG. 11 is a block diagram illustrating the principles of the present invention.

Prior to describing preferred embodiments of the present invention, the principles of the present invention will first be described below with reference to FIG. 11. Those parts shown in FIG. 11 which are identical to those shown in FIG. 3 are denoted by identical reference characters, and will not be described in detail below. An OADM node which is a basic optical communication apparatus will be described below.

An OADM node according to the present invention handles a supplied wavelength-division-multiplexed optical signal separately as a wavelength-division-multiplexed optical signal in a through wavelength group which passes through the node (transmission apparatus) and a wavelength-division-multiplexed optical signal in a dropped wavelength group which is dropped from the node (transmission apparatus), and also handles a wavelength-division-multiplexed optical signal in an added wavelength group as inserted signals to be combined, and is characterized by an auxiliary DCM for at least one of the above wavelength groups. Specifically, the supplied wavelength-division-multiplexed optical signal is divided into a through wavelength group and a dropped wavelength group by some dividing unit. The dropped wavelength group is demultiplexed by DMUX 30 and received by receiver 70. Added optical signals from transmitter 80 are multiplexed by MUX 40 into an added wavelength group, which is combined with the through wavelength group by some combining unit. The combined wavelength group is output as an output wavelength-division-multiplexed optical signal.

Since a wavelength group is wavelength-division-multiplexed for transmission through a single optical fiber, the values of dispersion in a plurality of wavelength channels can be adjusted altogether by a single DCM. It is thus possible to have different values of dispersion for transmitted and received optical signals by adding a single auxiliary DCM. The present invention is applicable if even one of the above three wavelength groups exists.

Prior to describing preferred embodiments of the present invention in detail, three basic arrangements of the present invention will be described below with reference to FIGS. 12 through 15. It is assumed in the description which follows that accumulated dispersion in receiver 70 has an optimum value of +300 ps/nm.

Figure 12:
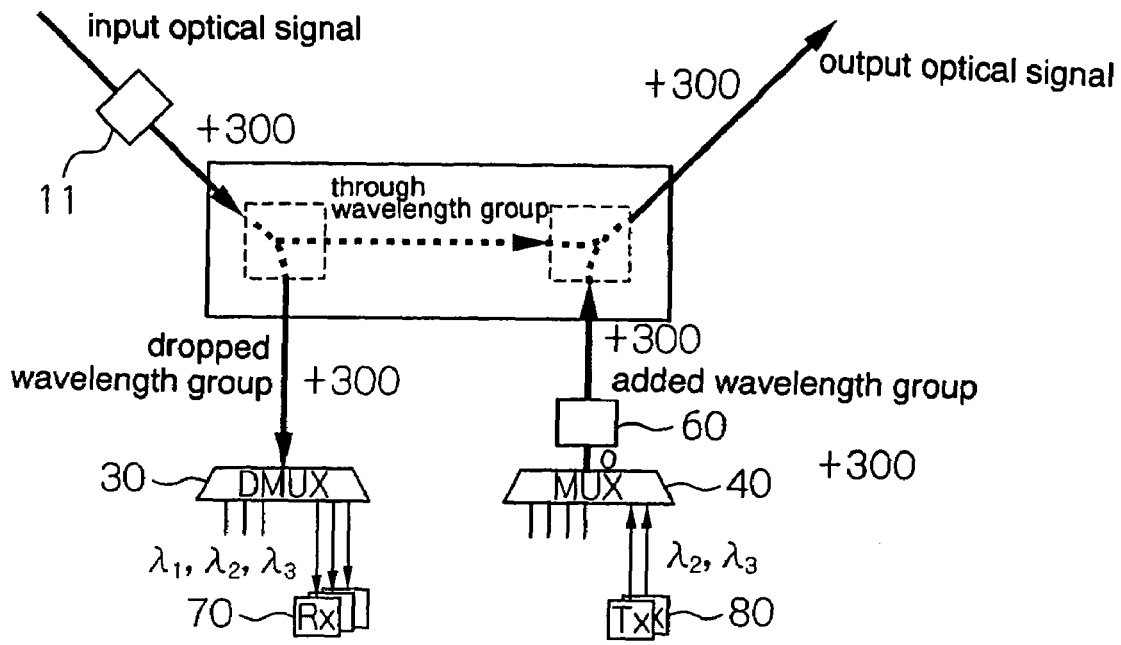
FIG. 12 is a block diagram of a first basic arrangement of the present invention.

First Basic Arrangement of the Present Invention:

A first basic arrangement of the present invention is shown in FIG. 12. According to the first basic arrangement, receiving DCM 11 is provided for a supplied wavelength-division-multiplexed optical signal, and auxiliary DCM 60 is provided for a wavelength-division-multiplexed optical signal in an added wavelength group.

Receiving DCM 11 adjusts the accumulated dispersion of a supplied wavelength-division-multiplexed optical signal such that it has an optimum value in receiver 70 for receiving optical signals in respective dropped wavelength channels, i.e., +300 ps/nm. Auxiliary DCM 60 applies the same value of accumulated dispersion as the accumulated dispersion adjusted by receiving DCM 11, i.e., +300 ps/nm, to a wavelength-division-multiplexed optical signal in an added wavelength group.

With the arrangement shown in FIG. 12, receiving DCM 11 compensates for the dispersion of a supplied wavelength-division-multiplexed optical signal such that the accumulated dispersion thereof has a value of +300 ps/nm. Therefore, the accumulated dispersion of both a dropped wavelength group and a through wavelength group has a value of +300 ps/nm. The dropped wavelength group is demultiplexed by DMUX 30 and received by receiver 70. Therefore, the dropped wavelength group is received with the optimum value of accumulated dispersion. An added wavelength group that is generated by MUX 40 is given a dispersion of +300 ps/nm by auxiliary DCM 60, and hence has an accumulated dispersion of +300 ps/nm. Since the accumulated dispersion of both the through wavelength group and the added wavelength group has a value of +300 ps/nm, when the through wavelength group and the added wavelength group are combined into an output wavelength-division-multiplexed optical signal, the accumulated dispersion in each wavelength channel of the output wavelength-division-multiplexed optical signal has an identical value.

Figure 13:
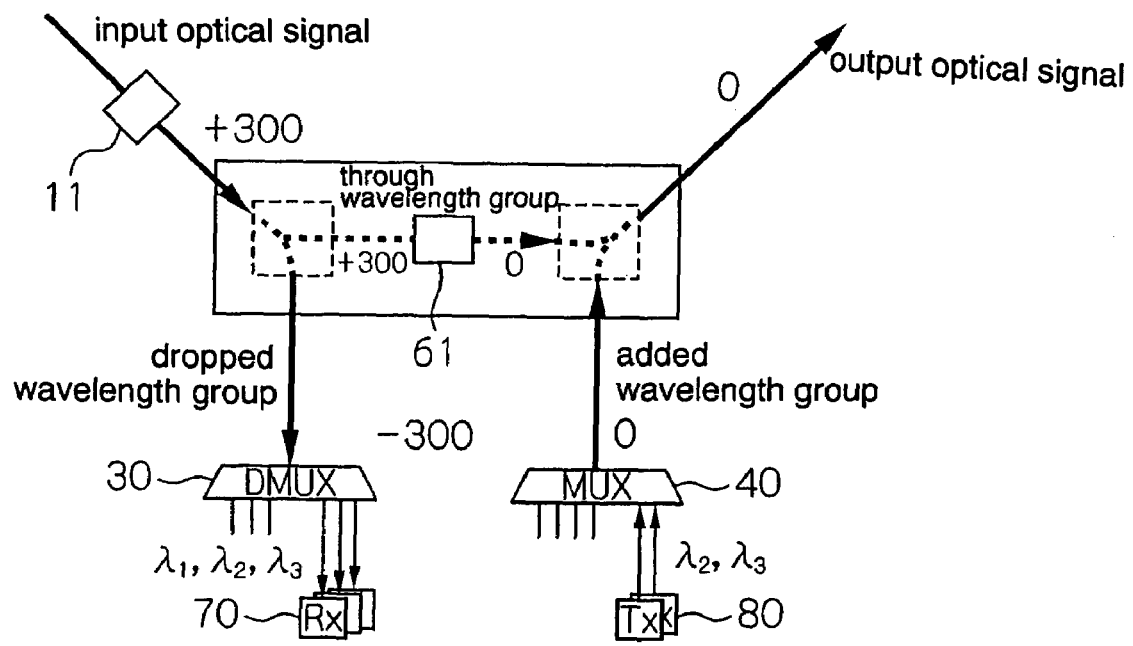
FIG. 13 is a block diagram of a second basic arrangement of the present invention.

Second Basic Arrangement of the Present Invention:

A second basic arrangement of the present invention is shown in FIG. 13. According to the second basic arrangement, receiving DCM 11 is provided for a supplied wavelength-division-multiplexed optical signal, and auxiliary DCM 60 is provided for a wavelength-division-multiplexed optical signal in a through wavelength group.

Receiving DCM 11 adjusts the accumulated dispersion of a supplied wavelength-division-multiplexed optical signal such that it has an optimum value in receiver 70 for receiving optical signals in respective dropped wavelength channels, i.e., +300 ps/nm. Auxiliary DCM 60 applies a value of accumulated dispersion for canceling out the accumulated dispersion adjusted by receiving DCM 11, i.e., −300 ps/nm, to a wavelength-division-multiplexed optical signal in a through wavelength group.

With the arrangement shown in FIG. 13, as with the arrangement shown in FIG. 12, receiving DCM 11 compensates for the dispersion of a supplied wavelength-division-multiplexed optical signal such that the accumulated dispersion thereof has a value of +300 ps/nm. Therefore, the accumulated dispersion of both a dropped wavelength group and a through wavelength group has a value of +300 ps/nm. The dropped wavelength group is demultiplexed by DMUX 30 and received by receiver 70. Therefore, the dropped wavelength group is received with the optimum value of accumulated dispersion. A through wavelength group is given a dispersion of −300 ps/nm by auxiliary DCM 60, and hence has an accumulated dispersion of 0 ps/nm. An added wavelength group that is generated by MUX 40 is not compensated for dispersion, and hence has an accumulated dispersion of 0 ps/nm. Since the accumulated dispersion of both the through wavelength group and the added wavelength group has a value of 0 ps/nm, when the through wavelength group and the added wavelength group are combined into an output wavelength-division-multiplexed optical signal, the accumulated dispersion in each wavelength channel of the output wavelength-division-multiplexed optical signal has an identical value.

Figure 14:
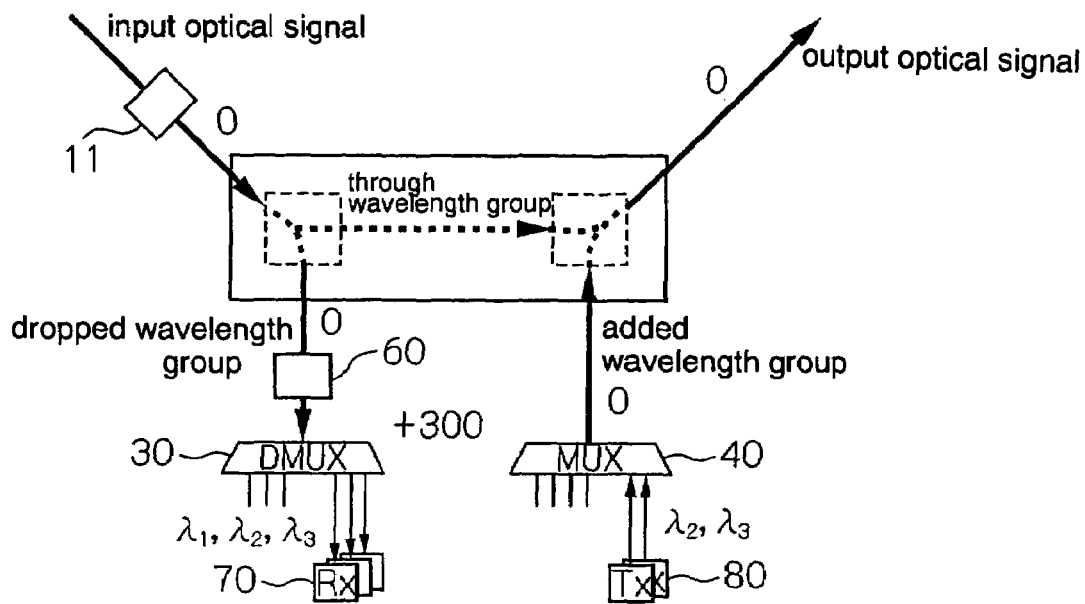
FIG. 14 is a block diagram of a third basic arrangement of the present invention.

Third Basic Arrangement of the Present Invention:

A third basic arrangement of the present invention is shown in FIG. 14. According to the third basic arrangement, receiving DCM 11 is provided for a supplied wavelength-division-multiplexed optical signal, and auxiliary DCM 60 is provided for a wavelength-division-multiplexed optical signal in a dropped wavelength group.

Receiving DCM 11 adjusts the accumulated dispersion of a supplied wavelength-division-multiplexed optical signal such that it has a value of 0 ps/nm. Auxiliary DCM 60 adjusts the accumulated dispersion of a wavelength-division-multiplexed optical signal in a dropped wavelength group such that it has an optimum value in receiver 70 for receiving optical signals in respective dropped wavelength channels, i.e., +300 ps/nm.

With the arrangement shown in FIG. 14, receiving DCM 11 compensates for the dispersion of a supplied wavelength-division-multiplexed optical signal such that it has a value of 0 ps/nm. Therefore, the accumulated dispersion of both a dropped wavelength group and a through wavelength group has a value of 0 ps/nm. The dropped wavelength group is given a dispersion of +300 ps/nm by auxiliary DCM 60, and is supplied with an accumulated dispersion of +300 ps/nm to DMUX 30. Therefore, the dropped wavelength group is received by receiver 70 with the optimum value of accumulated dispersion. Since the accumulated dispersion of both the through wavelength group and the added wavelength group has a value of 0 ps/nm, when the through wavelength group and the added wavelength group are combined into an output wavelength-division-multiplexed optical signal, the accumulated dispersion in each wavelength channel of the output wavelength-division-multiplexed optical signal has an identical value.

Now, preferred embodiments of the present invention in detail, which incorporate either one of the three basic arrangements described above, will be described below in detail below.

1st Exemplary Embodiment

Optical communication apparatus according to a first embodiment of the present invention, which has two MUXs, will be described below with reference to FIGS. 15 through 18.

According to the first embodiment, the principles of the present invention are applied to the conventional OADM node shown in FIG. 3 which is currently in most widespread use. The optical communication apparatus according to the first embodiment has new MUX 41 in addition to the conventional arrangement, thereby having two MUXs 40, 41 to provide a path for an added wavelength group, and also has auxiliary DCM 60 (or 61) inserted in the path for an added wavelength group. The arrangement according to the first embodiment makes it possible to provide different values of dispersion when a wavelength-division-multiplexed optical signal is transmitted and received.

Though the conventional arrangement has single MUX 40, the optical communication apparatus according to the first embodiment has two MUXs 40, 41 for multiplexing through and added optical signals, respectively. Since the path for a through wavelength group and the path for an added wavelength group are separate from each other, the dispersions of the through and added wavelength groups can individually be adjusted. Specifically, an arrangement shown in FIG. 15 according to the first embodiment has auxiliary DCM 60 incorporated to act on the added wavelength group, and an arrangement shown in FIG. 16 according to the first embodiment has auxiliary DCM 61 incorporated to act on the through wavelength group.

First, the OADM node according to the first embodiment will be described below with reference to FIG. 15 which shows the arrangement in which auxiliary DCM 60 is inserted to act on the added wavelength group. Those parts shown in FIG. 15 which are identical to those shown in FIG. 3 are denoted by identical reference characters, and will not be described in detail below.

Figure 15:
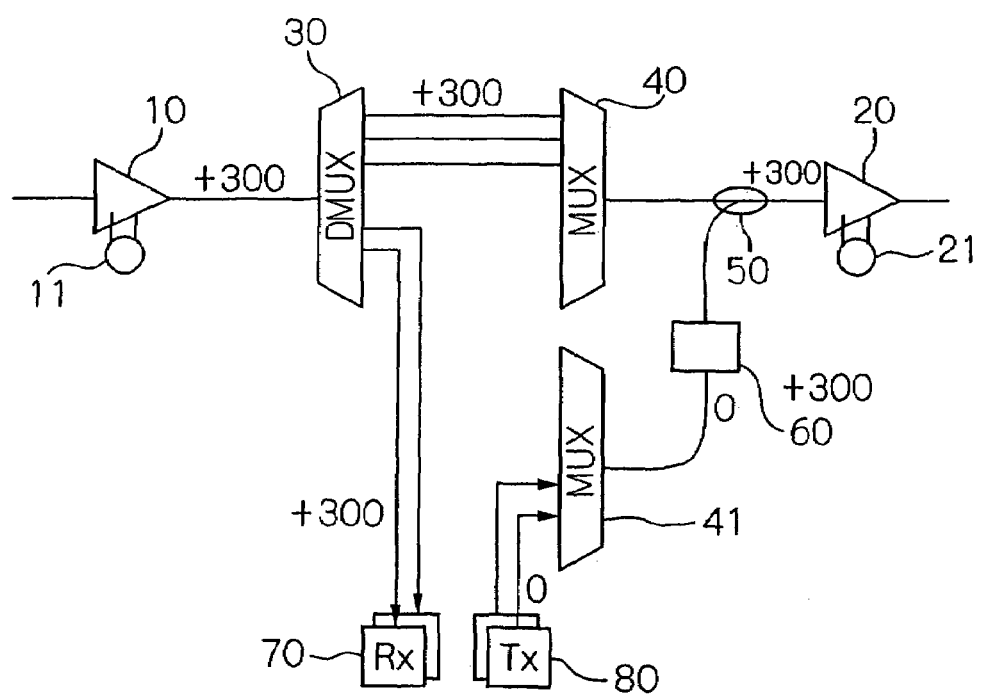
FIG. 15 is a block diagram of an OADM node according to a first embodiment of the present invention, which has two MUXs and an auxiliary DCM that is incorporated to act on an added wavelength group.

As shown in FIG. 15, the OADM node according to the first embodiment comprises receiving amplifier 10, transmitting amplifier 20, demultiplexer (DMUX) 30, multiplexers (MUXS) 40, 41, combining coupler 50, auxiliary DCM 60, receiver (Rx) 70, and transmitter (Tx) 80. Receiving amplifier 10 is combined with receiving dispersion compensating module (receiving DCM) 11, and transmitting amplifier 20 is combined with transmitting dispersion compensating module (transmitting DCM) 21.

Receiving DCM 11 compensates for a dispersion of a wavelength-division-multiplexed optical signal supplied to receiving amplifier 10 such that an optimum value of accumulated dispersion for reception, i.e., a bit error rate for reception, is minimum. DMUX 30 demultiplexes the wavelength-division-multiplexed optical signal whose accumulated dispersion has been adjusted by receiving DCM 11 into optical signals having respective wavelengths.

MUX 40 multiplexes through signals of optical signals that have been demultiplexed by DMUX 30. MUX 41 multiplexes a plurality of added (inserted) optical signals from transmitter 80. Auxiliary DCM 60 applies the same value of accumulated dispersion as the accumulated dispersion adjusted by receiving DCM 11 to a wavelength-division-multiplexed optical signal from MUX 41.

Combining coupler 50 combines a wavelength-division-multiplexed optical signal from MUX 40 with the wavelength-division-multiplexed optical signal whose accumulated dispersion has been adjusted by auxiliary DCM 60, and outputs a wavelength-division-multiplexed optical signal to transmitting amplifier 20. Transmitting DCM 21 compensates for a dispersion of the wavelength-division-multiplexed optical signal output from combining coupler 50.

With the arrangement shown in FIG. 15, values of dispersion will be configured as follows: It is assumed in the description which follows that the value of dispersion of a received optical signal is adjusted to +300 ps/nm.

A received wavelength-division-multiplexed optical signal is compensated for dispersion by receiving DCM 11 combined with receiving amplifier 10 such that the accumulated dispersion up to receiving amplifier 10 is canceled out and remaining dispersion has a value of +300 ps/nm. Since the accumulated dispersion up to receiving amplifier 10 is determined by the product of a value of dispersion per unit length of the optical fiber transport path and the length of the optical fiber transport path, the value of receiving DCM 11 is selected from the accumulated dispersion and the value of dispersion which is to remain.

The wavelength-division-multiplexed optical signal having a dispersion of +300 ps/nm is demultiplexed by DMUX 30, and dropped channels are supplied to and received by receiver 70. Since the dispersion of the dropped channels when they are received by receiver 70 has a value of +300 ps/nm, the dropped channels are received under best conditions. Through signals having a dispersion of +300 ps/nm are sent from DMUX 30 to through-signal MUX 40, which multiplexes the through signals.

Added channels from transmitter 80 are multiplexed by added-signal MUX 41 into a wavelength-division-multiplexed optical signal, to which a dispersion of +300 ps/nm is given when it passes through auxiliary DCM 60. The wavelength-division-multiplexed optical signal whose accumulated dispersion has been adjusted by auxiliary DCM 60 and the wavelength-division-multiplexed optical signal having a dispersion of +300 ps/nm in the through channels are combined with each other by combining coupler 50, whereupon the wavelength-division multiplexing of an optical signal to be output is completed. At this time, the optical signal to be output has identical dispersions of +300 ps/nm in respective channels. If the optical signal to be output to a next optical fiber transport path should have a value of dispersion different from +300 ps/nm, then transmitting DCM 21 is put into operation. For example, if transmitting DCM 21 applies a dispersion of −300 ps/nm, then the accumulated dispersion of the optical signal output from transmitting amplifier 20 has a value of 0 ps/nm.

The arrangement according to the first embodiment in which auxiliary DCM 61 is inserted to act on the through wavelength group will be described below with reference to FIG. 16.

Figure 16:
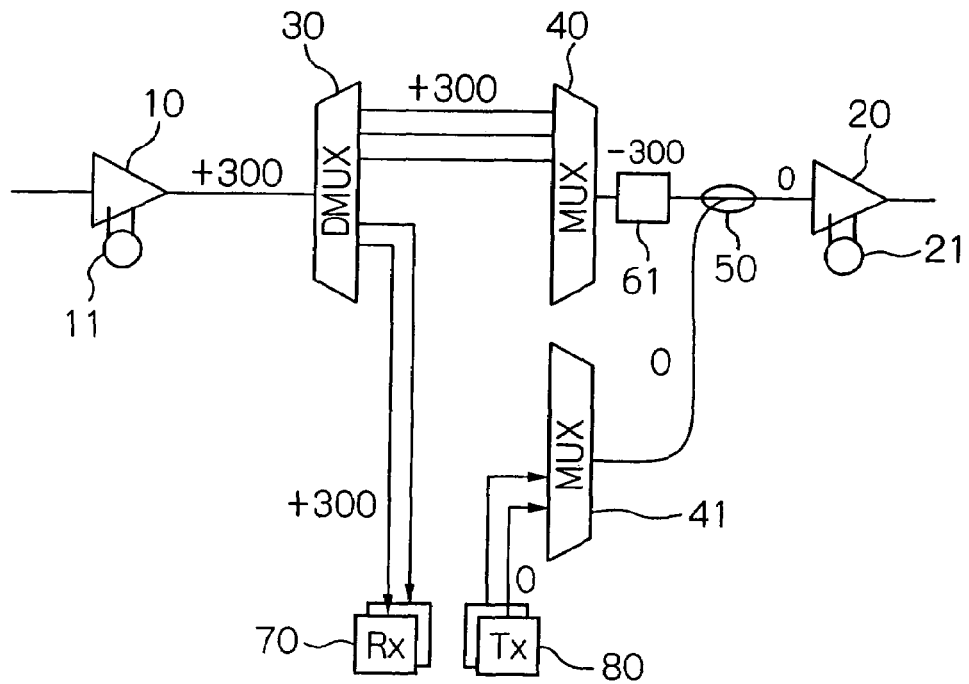
FIG. 16 is a block diagram of an OADM node according to the first embodiment of the present invention, which has two MUXs and an auxiliary DCM that is incorporated to act on a through wavelength group.

As shown in FIG. 16, the arrangement differs from the arrangement shown in FIG. 15 in that auxiliary DCM 60 inserted to act on the added wavelength group is removed and auxiliary DCM 61 is inserted to act on the through wavelength group.

Auxiliary DCM 61 applies a value of accumulated dispersion for canceling out the accumulated dispersion adjusted by receiving DCM 11, i.e., −300 ps/nm, to a wavelength-division-multiplexed optical signal from MUX 40.

A received wavelength-division-multiplexed optical signal is compensated for dispersion by receiving DCM 11 combined with receiving amplifier 10 such that its dispersion has a value of +300 ps/nm. The wavelength-division-multiplexed optical signal is demultiplexed by DMUX 30, and dropped channels are supplied to and received by receiver 70. Since the dispersion of the dropped channels when they are received by receiver 70 has a value of +300 ps/nm, the dropped channels are received under best conditions. Through signals having a dispersion of +300 ps/nm are sent from DMUX 30 to through-signal MUX 40, which multiplexes the through signals. Details of the arrangement shown in FIG. 16 up to this point are identical to those of the arrangement shown in FIG. 15. When the wavelength-division-multiplexed optical signal from MUX 40 passes through auxiliary DCM 61 which applies a dispersion of −300 ps/nm, the dispersion of the wavelength-division-multiplexed optical signal becomes 0 ps/nm.

Added channels from transmitter 80 are multiplexed by added-signal MUX 41 into a wavelength-division-multiplexed optical signal, which is combined with the wavelength-division-multiplexed optical signal having the dispersion of 0 ps/nm from auxiliary DCM 61, whereupon the wavelength-division multiplexing of an optical signal to be output is completed. At this time, the optical signal to be output has identical dispersions of 0 ps/nm in respective channels. If the optical signal to be output to a next optical fiber transport path should have a value of dispersion different from 0 ps/nm, then transmitting DCM 21 is put into operation.

Figure 6:
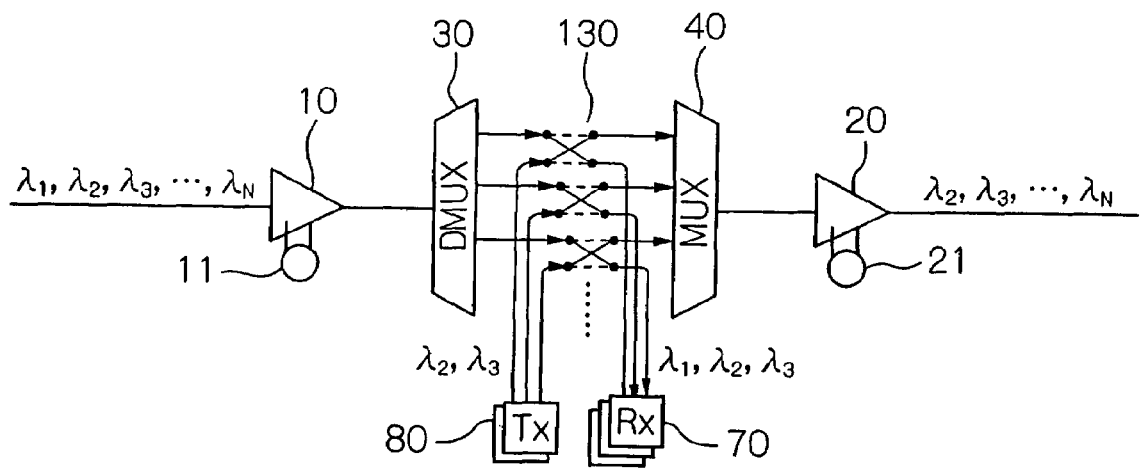
FIG. 6 is a block diagram of a conventional parallel OADM node with switches.
Figure 7:
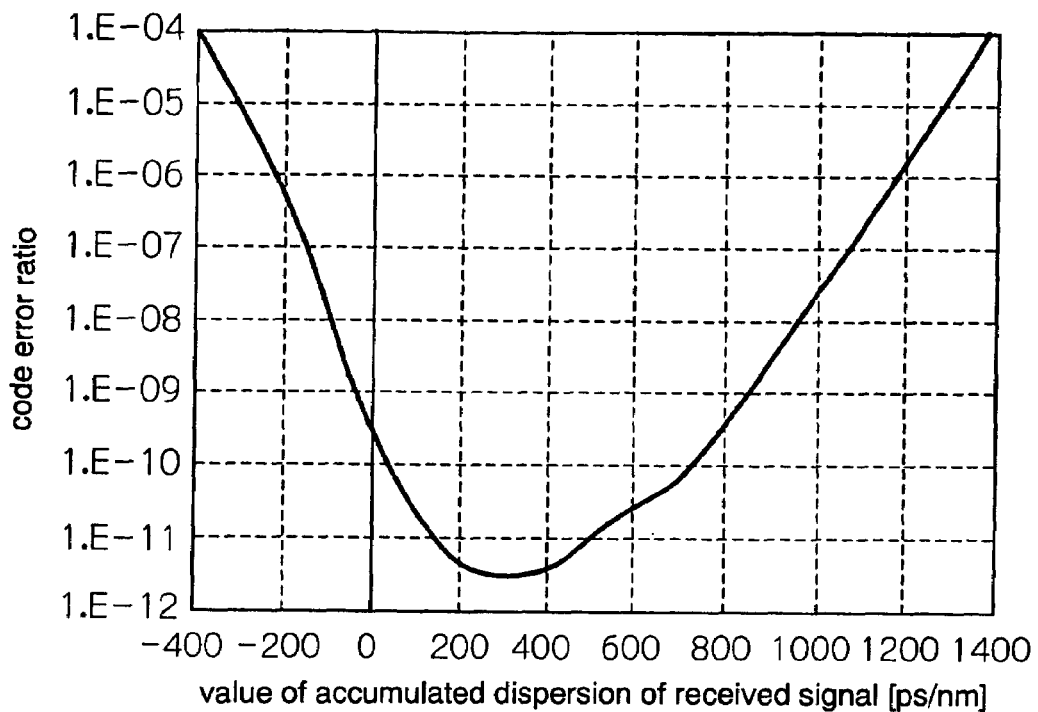
FIG. 7 is a diagram showing measured data of a bit error rate with respect to accumulated dispersion when an optical signal is received by a receiving terminal of a wavelength division multiplexing optical communication system.
Figure 8:
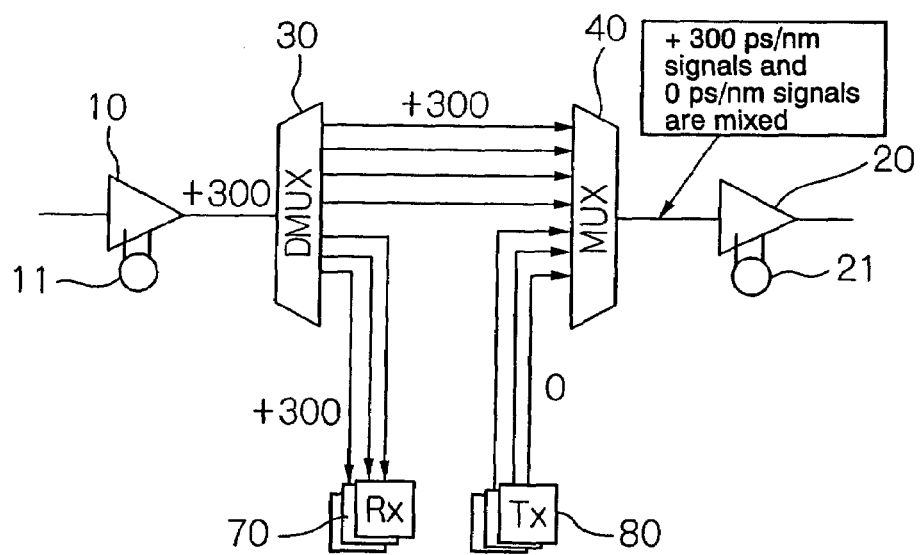
FIG. 8 is a block diagram illustrating problems which occur with different values of dispersion at transmitting and receiving stations in a conventional system.
Figure 9:
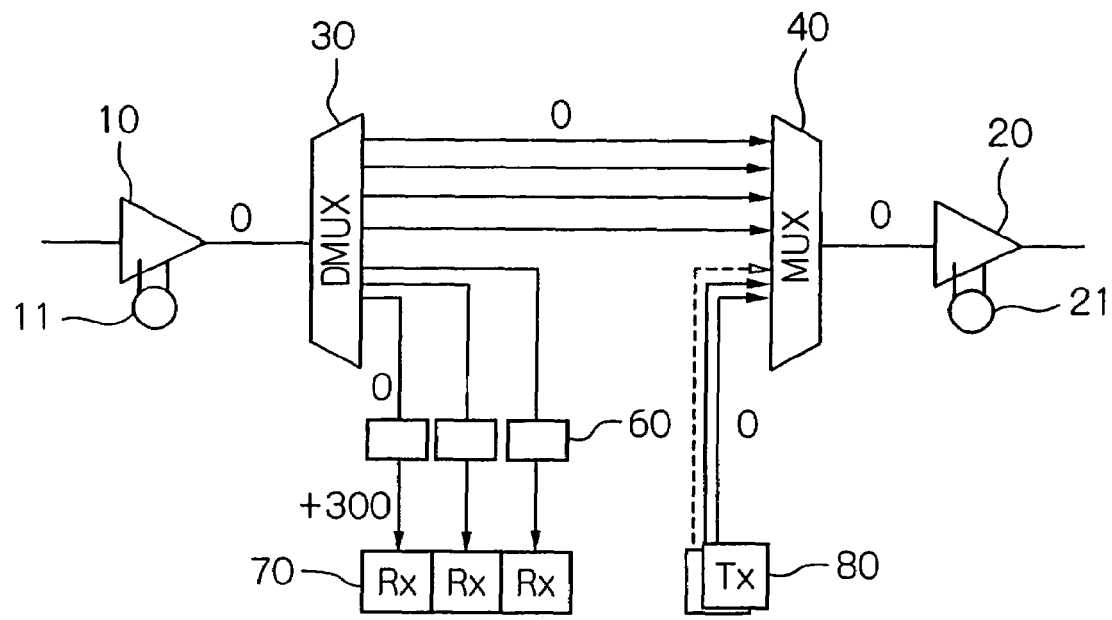
FIG. 9 is a block diagram of a conventional OADM node wherein individual auxiliary DCMs are inserted for respective wavelength channels for setting accumulated dispersion to an optimum value when an optical signal is received.
Figure 10:
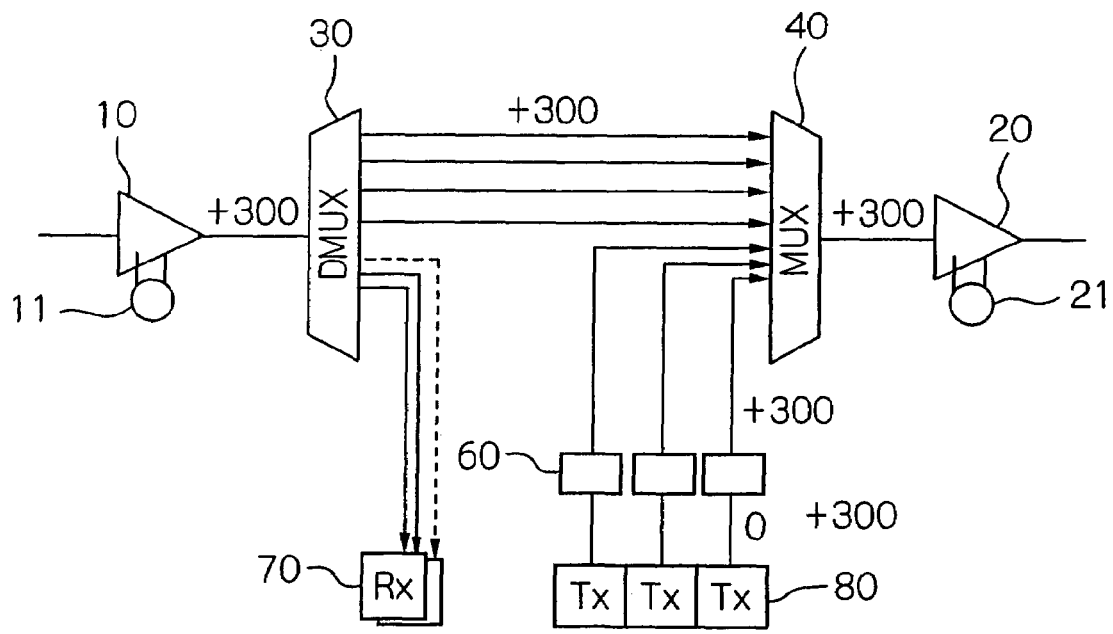
FIG. 10 is a block diagram of another conventional OADM node wherein individual auxiliary DCMs are inserted for respective wavelength channels for setting accumulated dispersion to an optimum value when an optical signal is received.
Figure 17:
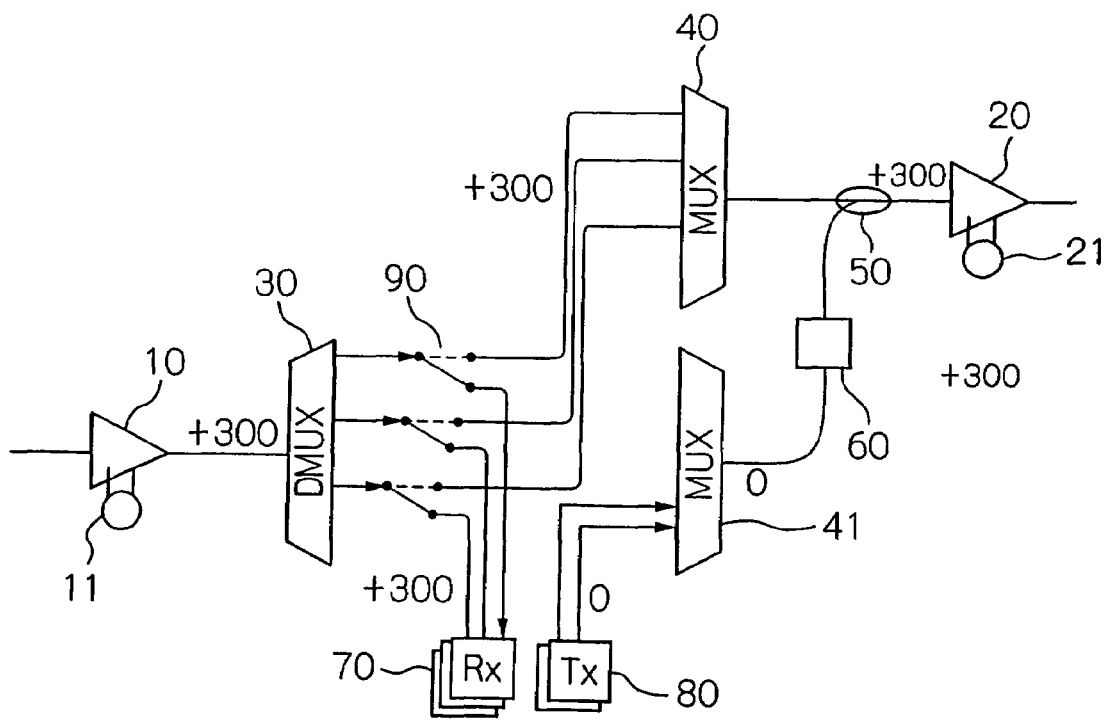
FIG. 17 is a block diagram of the OADM node shown in FIG. 15 with optical switches added thereto.
Figure 18:
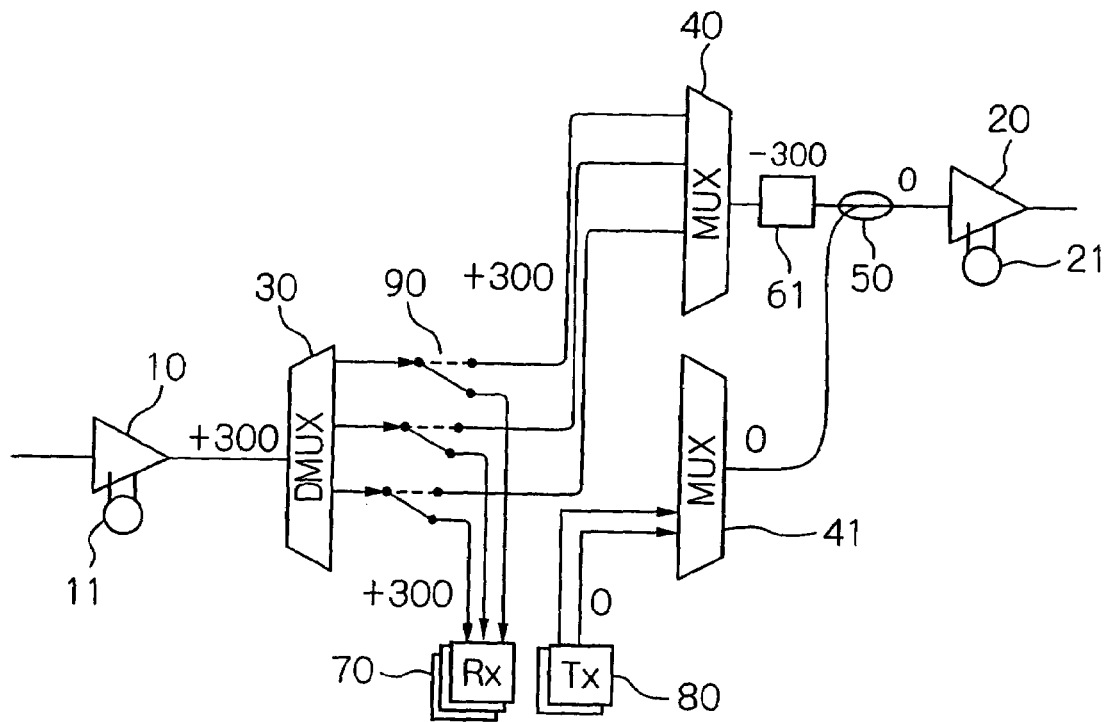
FIG. 18 is a block diagram of the OADM node shown in FIG. 16 with optical switches added thereto.

Other arrangements according to the first embodiment which are combined with the conventional arrangement with the optical switches shown in FIG. 6 are illustrated in FIGS. 17 and 18.

In FIGS. 17 and 18, optical switches 90 selectively output optical signals having respective wavelengths demultiplexed by DMUX 30 as through signals to MUX 40 or as dropped (extracted) signals to receiver 70 in respective wavelength channels.

Optical switches 90 are advantageous in that the number of connection ports as viewed from the user is the same as that in the conventional arrangement shown in FIG. 6, thereby reducing connection errors. With the arrangements shown in FIGS. 15 and 16, the number of connection ports of the MUXs is twice the number of connection ports of the MUX in the conventional arrangement, and different connection ports are used for through and added signals even if they are in the same wavelength channels, tending to cause connection errors. The arrangements with optical switches 90 shown in FIGS. 17 and 18 are free of the above problem, and can be used in the same manner as with the conventional arrangement.

2nd Exemplary Embodiment

An optical communication apparatus according to a second embodiment of the present invention, which has two DMUXs, will be describe below with reference to FIGS. 19 through 22.

According to the second embodiment, as with the first embodiment described above, the principles of the present invention are also applied to the conventional OADM node shown in FIG. 3 which is currently in most widespread use. The optical communication apparatus according to the second embodiment has new DMUX 31 in addition to the conventional arrangement, thereby having two DMUXs 30, 31 to provide a path for a dropped wavelength group, and also has auxiliary DCM 60 (or 61) inserted in the path for a dropped wavelength group. The arrangement according to the second embodiment makes it possible to provide different values of dispersion when a wavelength-division-multiplexed optical signal is transmitted and received.

Though the conventional arrangement has single DMUX 30, the optical communication apparatus according to the second embodiment has two DMUXs 30, 31 for demultiplexing through and dropped optical signals, respectively. Since the path for a through wavelength group and the path for a dropped wavelength group are separate from each other, the dispersions of the through and dropped wavelength groups can individually be adjusted. Specifically, an arrangement shown in FIG. 19 according to the second embodiment has auxiliary DCM 60 incorporated to act on the dropped wavelength group, and an arrangement shown in FIG. 30 according to the second embodiment has auxiliary DCM 61 incorporated to act on the through wavelength group.

Figure 21:
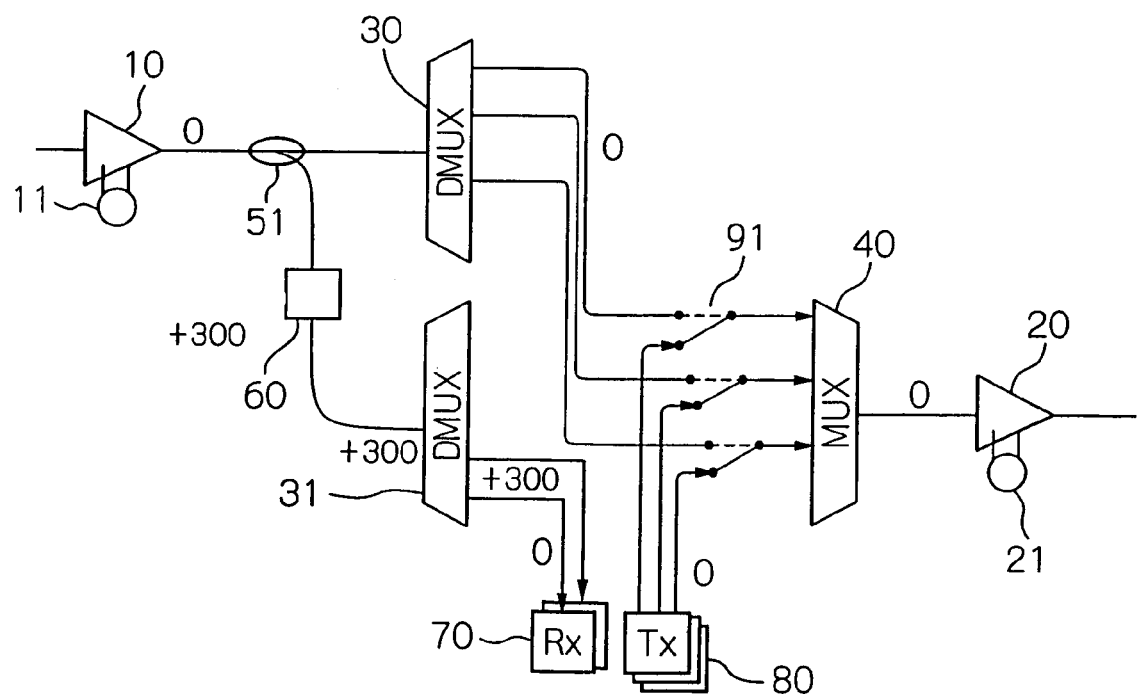
FIG. 21 is a block diagram of the OADM node shown in FIG. 19 with optical switches added thereto.
Figure 22:
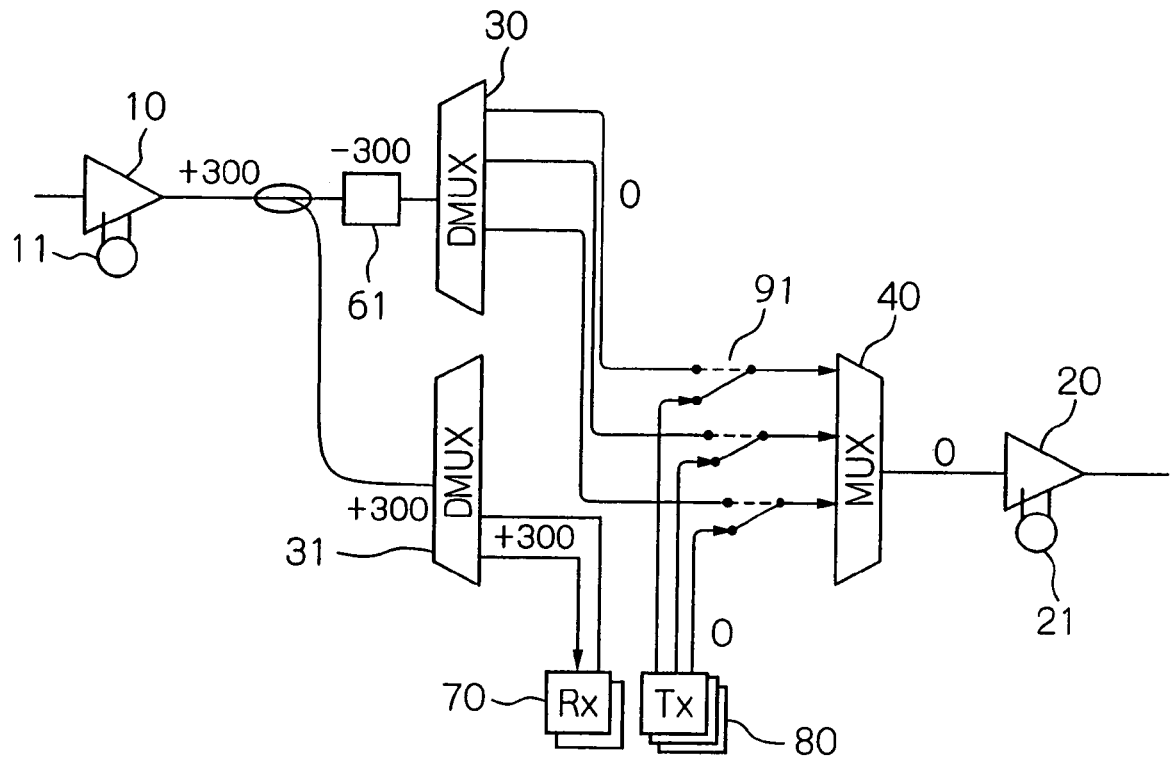
FIG. 22 is a block diagram of the OADM node shown in FIG. 20 with optical switches added thereto.

Other arrangements according to the second embodiment which are combined with the conventional arrangement with the optical switches shown in FIG. 6 are illustrated in FIGS. 21 and 22.

In FIGS. 21 and 22, optical switches 91 selectively output optical signals having respective wavelengths demultiplexed by DMUX 30 as through signals to MUX 40 or output optical signals having respective wavelengths from transmitter 80 as added signals to MUX 40 in respective wavelength channels. Optical switches 91 offer the same advantages as optical switches 90 that are incorporated in the arrangements shown in FIGS. 17 and 18 according to the first embodiment.

Values of dispersion with the arrangements shown in FIGS. 19 through 22 will be configured as follows: First, the arrangement shown in FIG. 19 in which auxiliary DCM 60 is inserted in the path for a dropped wavelength group will be described below.

Figure 19:
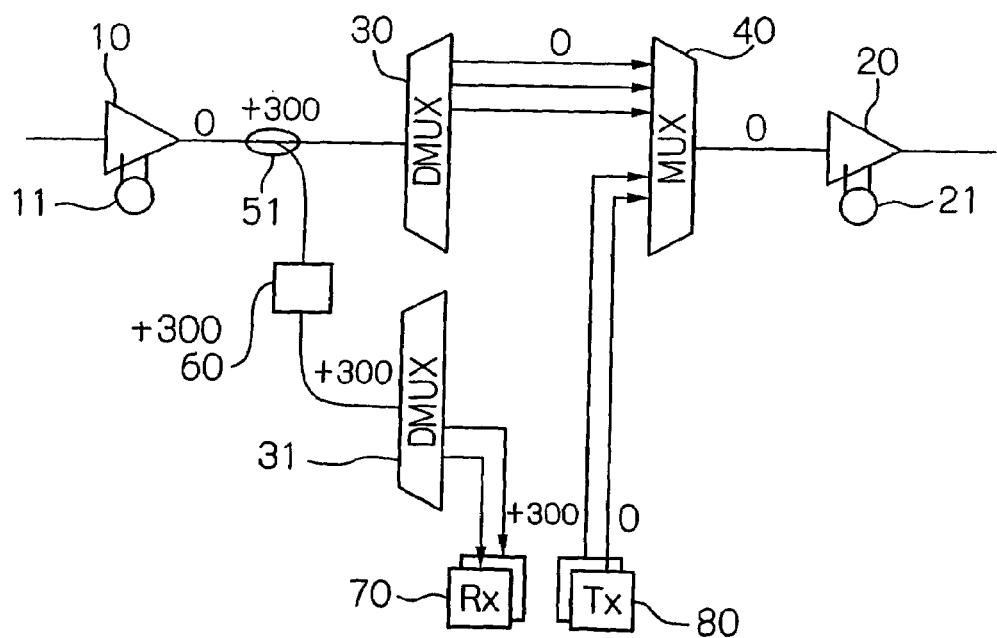
FIG. 19 is a block diagram of an OADM node according to a second embodiment of the present invention, which has two MUXs and an auxiliary DCM that is incorporated to act on a dropped wavelength group.

As shown in FIG. 19, the OADM node according to the second embodiment comprises receiving amplifier 10, transmitting amplifier 20, demultiplexers (DMUXs) 30, 31, multiplexer (MUX) 40, dividing coupler 51, auxiliary DCM 60, receiver (Rx) 70, and transmitter (Tx) 80. Receiving amplifier 10 is combined with receiving DCM 11, and transmitting amplifier 20 is combined with transmitting DCM 21. Those parts shown in FIG. 19 which are identical to those shown in FIG. 15 are denoted by identical reference characters, and will not be described in detail below.

Dividing coupler 51 divides a wavelength-division-multiplexed optical signal whose accumulated dispersion has been compensated for by receiving DCM 11 into two wavelength-division-multiplexed optical signals.

In the present embodiment, receiving DCM 11 compensates for the accumulated dispersion of the supplied wavelength-division-multiplexed optical signal such that the accumulated dispersion has a value of 0 ps/nm.

With the arrangement shown in FIG. 19, values of dispersion will be configured as follows: It is assumed in the description which follows that the value of dispersion of a received optical signal is adjusted to +300 ps/nm.

A received wavelength-division-multiplexed optical signal is compensated for dispersion by receiving DCM 11 combined with receiving amplifier 10 such that the accumulated dispersion up to receiving amplifier 10 is canceled out and remaining dispersion has a value of 0 ps/nm.

The wavelength-division-multiplexed optical signal having the dispersion of 0 ps/nm is divided into two wavelength-division-multiplexed optical signals by dividing coupler 51. One of the two wavelength-division-multiplexed optical signals is demultiplexed by dropped-signal DMUX 30, and the other wavelength-division-multiplexed optical signal passes as dropped channels through auxiliary DCM 60 which imparts a dispersion of +300 ps/nm to the wavelength-division-multiplexed optical signal. The wavelength-division-multiplexed optical signal with the dispersion of +300 ps/nm is then demultiplexed by through-signal DMUX 31 into optical signals in respective wavelengths, which are received by receiver 70. Since the dispersion of the dropped optical signals when they are received by receiver 70 has a value of +300 ps/nm, the dropped channels are received under best conditions.

Added channels from transmitter 80 and the through signals having the dispersion of 0 ps/nm from DMUX 30 are multiplexed by MUX 40. The dispersions of these added and through channels have an identical value of 0 ps/nm. If the optical signal to be output to a next optical fiber transport path should have a value of dispersion different from +0 ps/nm, then transmitting DCM 21 is put into operation.

Figure 20:
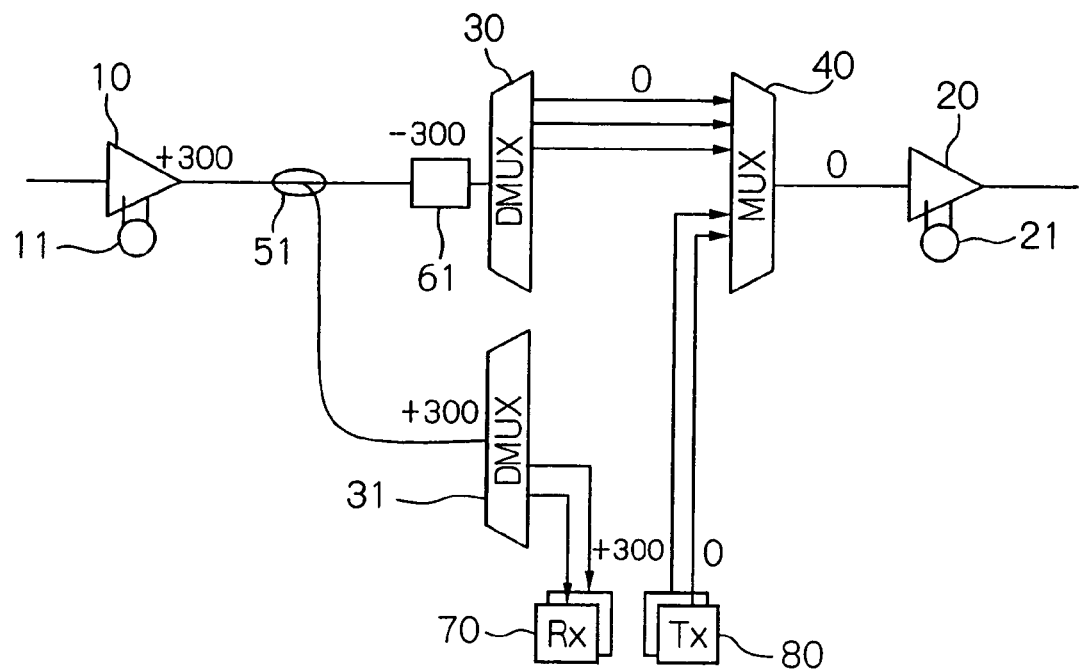
FIG. 20 is a block diagram of an OADM node according to the second embodiment of the present invention, which has two MUXs and an auxiliary DCM that is incorporated to act on a through wavelength group.

The arrangement shown in FIG. 20 in which auxiliary DCM 61 is inserted in the path for a through wavelength group operates as follows:

A received wavelength-division-multiplexed optical signal is compensated for dispersion by receiving DCM 11 combined with receiving amplifier 10 such that the dispersion thereof has a value of +300 ps/nm. The wavelength-division-multiplexed optical signal is then divided into two wavelength-division-multiplexed optical signals by dividing coupler 51. One of the two wavelength-division-multiplexed optical signals passes as through channels through auxiliary DCM 61 which imparts a dispersion of +300 ps/nm to the wavelength-division-multiplexed optical signal. The wavelength-division-multiplexed optical signal is then demultiplexed by through-signal DMUX 30 into optical signals in respective wavelengths. The other wavelength-division-multiplexed optical signal is demultiplexed by dropped-signal DMUX 31 into optical signals in respective wavelengths, which are received by receiver 70. Since the dispersion of the dropped optical signals when they are received by receiver 70 has a value of +300 ps/nm, the dropped channels are received under best conditions.

The through channels with the dispersion of 0 ps/nm from DMUX 30 and added channels from transmitter 80 are multiplexed by MUX 40, whereupon the wavelength-division multiplexing of an optical signal to be output is completed. At this time, the optical signal to be output has identical dispersions of +0 ps/nm in respective channels. If the optical signal to be output to a next optical fiber transport path should have a value of dispersion different from 0 ps/nm, then transmitting DCM 21 is put into operation.

3rd Exemplary Embodiment

Figure 5:
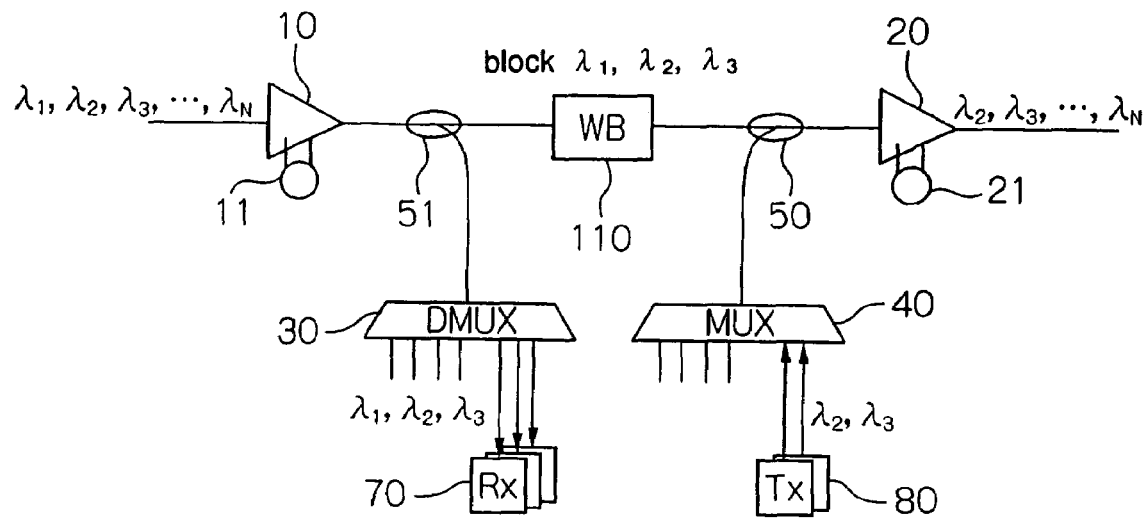
FIG. 5 is a block diagram of a conventional OADM node with a WB.

An optical communication apparatus according to a third embodiment of the present invention will be describe below with reference to FIGS. 23 through 25. According to the third embodiment, the principles of the present invention are applied to the OADM node shown in FIG. 5 which employs a wavelength blocker (WB) that is a new device which has been introduced into the art in recent years.

Figure 23:
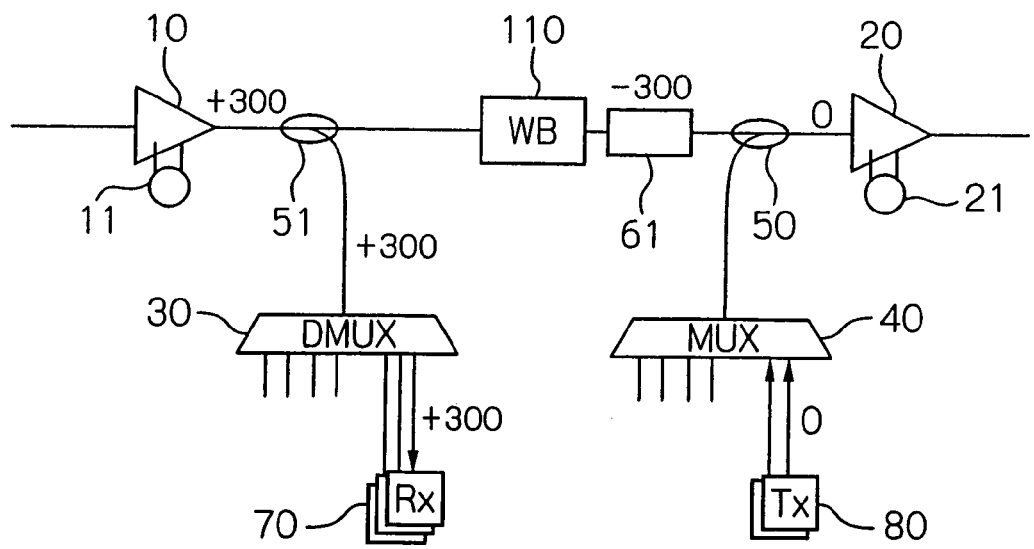
FIG. 23 is a block diagram of an OADM node according to a third embodiment of the present invention, which has a WB and an auxiliary DCM that is incorporated to act on a through wavelength group.

FIG. 23 shows an arrangement according to the third embodiment in which an auxiliary DCM is inserted into a path for a through wavelength group.

As shown in FIG. 23, the OADM node comprises receiving amplifier 10, transmitting amplifier 20, demultiplexer (DMUX) 30, multiplexer (MUX) 40, combining coupler 50, dividing coupler 51, auxiliary DCM 61, receiver (Rx) 70, transmitter (Tx) 80, and wavelength blocker (WB) 110. Receiving amplifier 10 is combined with receiving DCM 11, and transmitting amplifier 20 is combined with transmitting DCM 21. Those parts shown in FIG. 23 which are identical to those shown in FIGS. 15, 19 are denoted by identical reference characters, and will not be described in detail below.

WB 110 is supplied with one of two wavelength-division-multiplexed optical signals divided by dividing coupler 51, and passes only optical signals in wavelength channels as through signals.

In FIG. 23, auxiliary DCM 61 is inserted downstream of WB 110. However, auxiliary DCM 61 may be inserted upstream of WB 110.

With the arrangement shown in FIG. 23, values of dispersion will be configured as follows:

A received wavelength-division-multiplexed optical signal is compensated for dispersion by receiving DCM 11 combined with receiving amplifier 10 such that the accumulated dispersion up to receiving amplifier 10 is canceled out and remaining dispersion has a value of +300 ps/nm. Then, the wavelength-division-multiplexed optical signal is divided into two wavelength-division-multiplexed optical signals by dividing coupler 51.

One of the two wavelength-division-multiplexed optical signals is demultiplexed by dropped-signal DMUX 30 and then received by receiver 70. Since the dispersion of the dropped optical signals when they are received by receiver 70 has a value of +300 ps/nm, the dropped channels are received under best conditions.

The other wavelength-division-multiplexed optical signal is filtered by WB 110, so that only through signals pass therethrough. The through channels then pass through auxiliary DCM 61 which imparts a dispersion of −300 ps/nm to the through signals, which then have a dispersion of 0 ps/nm.

Added channels from transmitter 80 are multiplexed by added-signal MUX 40, and then combined with the through channels by combining coupler 50, the wavelength-division multiplexing of an optical signal to be output is completed. At this time, the optical signal to be output has identical dispersions of 0 ps/nm in respective channels. If the optical signal to be output to a next optical fiber transport path should have a value of dispersion different from 0 ps/nm, then transmitting DCM 21 is put into operation.

Figure 24:
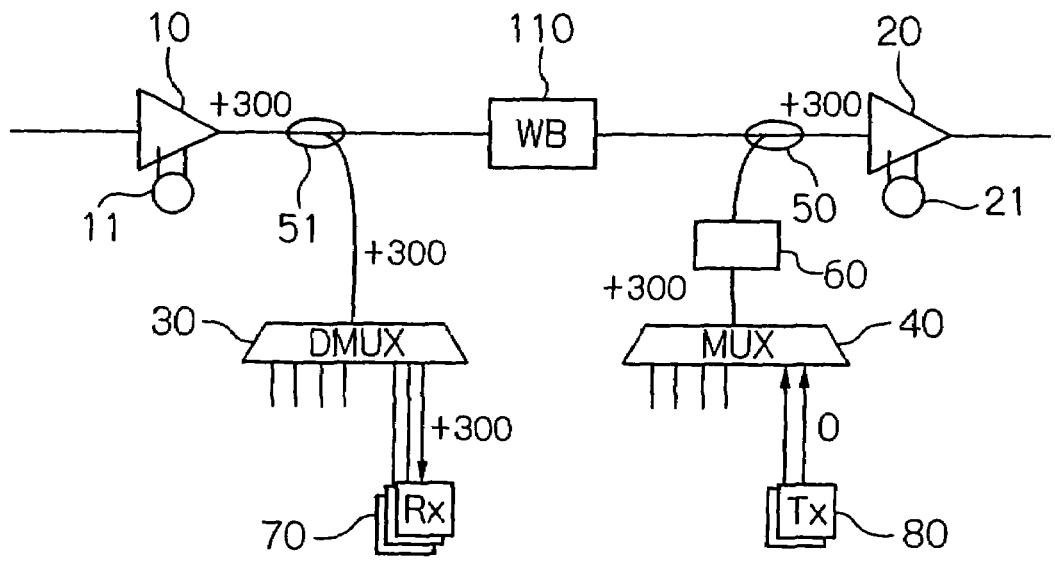
FIG. 24 is a block diagram of an OADM node according to the third embodiment of the present invention, which has a WB and an auxiliary DCM that is incorporated to act on an added wavelength group.

FIG. 24 shows an arrangement according to the third embodiment in which auxiliary DCM 60 is inserted into a path for an added wavelength group. With the arrangement shown in FIG. 24, values of dispersion will be configured as follows:

A received wavelength-division-multiplexed optical signal is compensated for dispersion by receiving DCM 11 combined with receiving amplifier 10 such that the accumulated dispersion up to receiving amplifier 10 is canceled out and remaining dispersion has a value of +300 ps/nm. Then, the wavelength-division-multiplexed optical signal is divided into two wavelength-division-multiplexed optical signals by dividing coupler 51.

One of the two wavelength-division-multiplexed optical signals is demultiplexed by dropped-signal DMUX 30 and then received by receiver 70. Since the dispersion of the dropped optical signals when they are received by receiver 70 has a value of +300 ps/nm, the dropped channels are received under best conditions. Operation up to this point is same as with the arrangement shown in FIG. 23.

The other wavelength-division-multiplexed optical signal is filtered by WB 110, so that only through signals pass therethrough.

Added channels from transmitter 80 are multiplexed by added-signal MUX 40, and then pass through auxiliary DCM 60 which imparts a dispersion of +300 ps/nm to the added signals, which then have a dispersion of +300 ps/nm. The added channels are then combined with the through channels by combining coupler 50, whereupon the wavelength-division multiplexing of an optical signal to be output is completed. At this time, the optical signal to be output has identical dispersions of +300 ps/nm in respective channels. If the optical signal to be output to a next optical fiber transport path should have a value of dispersion different from +300 ps/nm, then transmitting DCM 21 is put into operation.

Figure 25:
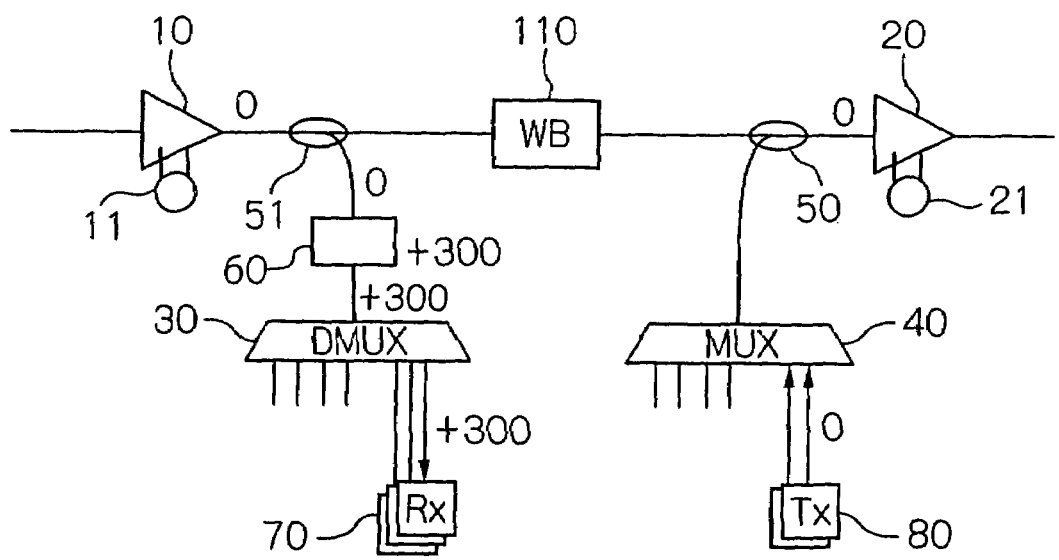
FIG. 25 is a block diagram of an OADM node according to the third embodiment of the present invention, which has a WB and an auxiliary DCM that is incorporated to act on a dropped wavelength group.

FIG. 25 shows an arrangement according to the third embodiment in which auxiliary DCM 60 is inserted into a path for a dropped wavelength group. With the arrangement shown in FIG. 25, values of dispersion will be configured as follows:

A received wavelength-division-multiplexed optical signal is compensated for dispersion by receiving DCM 11 combined with receiving amplifier 10 such that the accumulated dispersion up to receiving amplifier 10 is canceled out and remaining dispersion has a value of 0 ps/nm. Then, the wavelength-division-multiplexed optical signal is divided into two wavelength-division-multiplexed optical signals by dividing coupler 51.

One of the two wavelength-division-multiplexed optical signals passes through auxiliary DCM 60 which imparts a dispersion of +300 ps/nm to the dropped signals, which then have a dispersion of +300 ps/nm. The dropped signals are then demultiplexed by dropped-signal DMUX 30 and received by receiver 70. Since the dispersion of the dropped optical signals when they are received by receiver 70 has a value of +300 ps/nm, the dropped channels are received under best conditions.

The other wavelength-division-multiplexed optical signal is filtered by WB 110, so that only through signals pass therethrough.

Added channels from transmitter 80 are multiplexed by added-signal MUX 40, and then combined with the through channels by combining coupler 50, whereupon the wavelength-division multiplexing of an optical signal to be output is completed. At this time, the optical signal to be output has identical dispersions of 0 ps/nm in respective channels. If the optical signal to be output to a next optical fiber transport path should have a value of dispersion different from 0 ps/nm, then transmitting DCM 21 is put into operation.

The arrangements of the OADM node with WB 110 are the easiest to implement according to the present invention because the added cost due to the addition of auxiliary DCM 60 or 61 is small.

4th Exemplary Embodiment

An optical communication apparatus according to a fourth embodiment of the present invention will be describe below with reference to FIGS. 26 and 27. According to the fourth embodiment, the principles of the present invention are applied to an OADM node which employs a wavelength selective switch (WSS) that is being currently under research and development. The WSS is an advanced version of the WB, and is capable of switching between paths of individual wavelength channels in a supplied wavelength-division-multiplexed wavelength group. The WSS is seen as an optical 2×2 switch from individual wavelength channels. The WSS is a device capable of independently changing the paths of wavelength channels of a supplied wavelength-division-multiplexed optical signal.

The principles of the present invention are applicable to OADM nodes employing WSS because they have independent paths for added and dropped wavelength groups.

Figure 26:
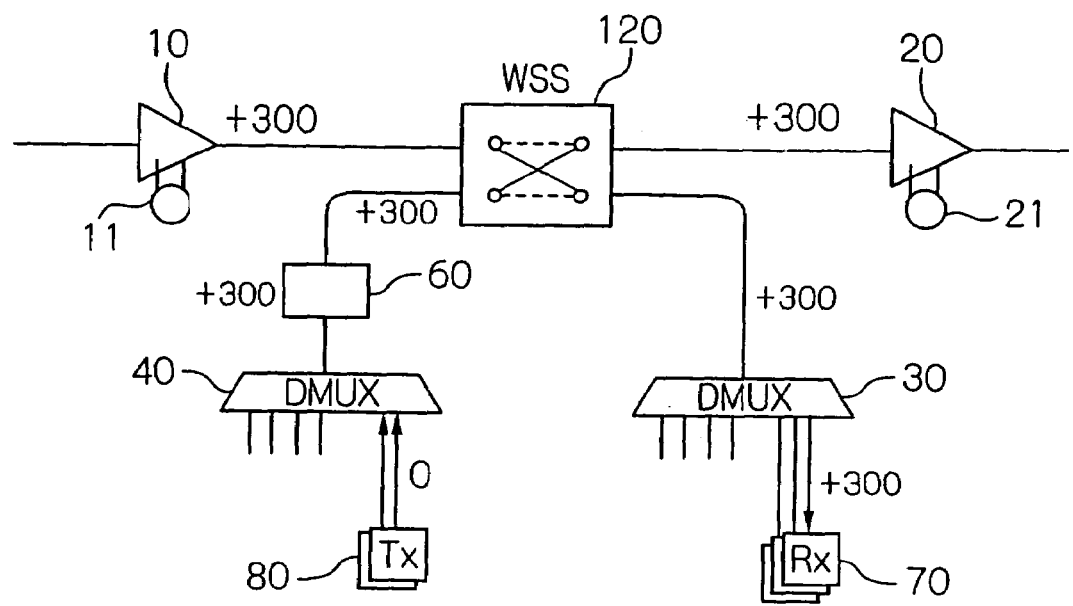
FIG. 26 is a block diagram of an OADM node according to a fourth embodiment of the present invention, which has a WSS (Wavelength Selective Switch) and an auxiliary DCM that is incorporated to act on an added wavelength group.

FIG. 26 shows an arrangement according to the fourth embodiment in which an auxiliary DCM is inserted into a path for an added wavelength group.

As shown in FIG. 6, the OADM node comprises receiving amplifier 10, transmitting amplifier 20, demultiplexer (DMUX) 30, multiplexer (MUX) 40, auxiliary DCM 60, receiver (Rx) 70, transmitter (Tx) 80, and wavelength selective switch (WSS) 120. Receiving amplifier 10 is combined with receiving DCM 11, and transmitting amplifier 20 is combined with transmitting DCM 21.

WSS 120 outputs wavelength channels as dropped signals from a wavelength-division-multiplexed optical signal whose accumulated dispersion has been adjusted by receiving DCM 11, as a wavelength-division-multiplexed optical signal in a dropped wavelength group to auxiliary DCM 60, and combines wavelength channels as through signals with a wavelength-division-multiplexed optical signal whose accumulated dispersion has been adjusted by auxiliary DCM 60, and outputs the combined optical signal as an output optical signal to transmitting amplifier 20.

As described above, WSS 120 a device capable of independently changing the paths of wavelength channels of a supplied wavelength-division-multiplexed optical signal. For example, when WSS 120 changes the path for a wavelength $\lambda_1$, WSS 120 outputs an optical signal having the wavelength $\lambda_1$ of a wavelength-division-multiplexed optical signal output from receiving amplifier 10 to DMUX 30, and outputs optical signals in other wavelengths to transmitting amplifier 20. WSS 120 outputs an optical signal having the wavelength $\lambda_1$ of a wavelength-division-multiplexed optical signal output from auxiliary DCM 60 to transmitting amplifier 20.

With the arrangement shown in FIG. 26, values of dispersion will be configured as follows:

A received wavelength-division-multiplexed optical signal is compensated for dispersion by receiving DCM 11 combined with receiving amplifier 10 such that the accumulated dispersion up to receiving amplifier 10 is canceled out and remaining dispersion has a value of +300 ps/nm. Then, the wavelength-division-multiplexed optical signal is supplied to WSS 120. Added channels from transmitter 80 are multiplexed by added-channel MUX 40, and then pass through auxiliary DCM 60 which imparts a dispersion of +300 ps/nm to the added signals, which then have a dispersion of +300 ps/nm. The added signals are thereafter supplied to WSS 120. Therefore, the two wavelength groups that are supplied to WSS 120 have the same value of dispersion.

WSS 120 exchanges individual channels of the two wavelength groups supplied thereto, and outputs two wavelength-division-multiplexed optical signals. One of the output wavelength-division-multiplexed optical signals is in the form of a wavelength-division-multiplexed optical signal to be transmitted, and the other in the form of a dropped wavelength group. Both have a dispersion of +300 ps/nm.

The dropped wavelength group is demultiplexed by dropped-signal DMUX 30 and received by receiver 70. Since the dispersion of the dropped channels when they are received by receiver 70 has a value of +300 ps/nm, the dropped channels are received under best conditions.

If the wavelength-division-multiplexed optical signal to be transmitted to a next optical fiber transport path should have a value of dispersion different from +300 ps/nm, then transmitting DCM 21 is put into operation.

Figure 27:
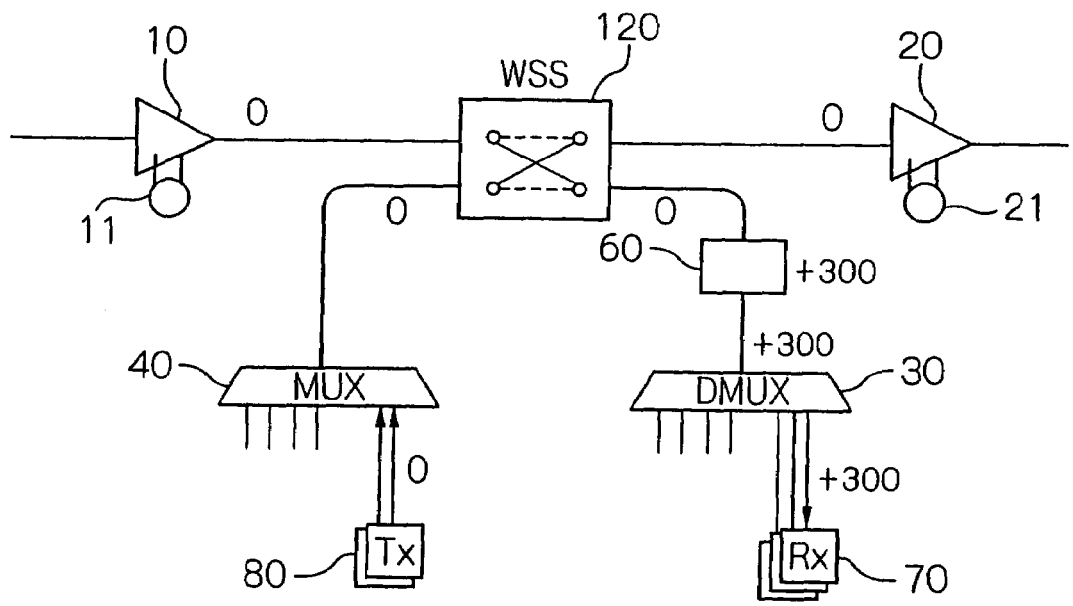
FIG. 27 is a block diagram of an OADM node according to the fourth embodiment of the present invention, which has a WSS and an auxiliary DCM that is incorporated to act on a dropped wavelength group.

FIG. 27 shows an arrangement according to the fourth embodiment in which an auxiliary DCM is inserted into a path for a dropped wavelength group. With the arrangement shown in FIG. 27, values of dispersion will be configured as follows:

A received wavelength-division-multiplexed optical signal is compensated for dispersion by receiving DCM 11 combined with receiving amplifier 10 such that the accumulated dispersion up to receiving amplifier 10 is canceled out and remaining dispersion has a value of 0 ps/nm. Then, the wavelength-division-multiplexed optical signal is supplied to WSS 120. Added channels from transmitter 80 are multiplexed by added-signal MUX 40, and then supplied to WSS 120. Therefore, the two wavelength groups that are supplied to WSS 120 have the same value of dispersion.

WSS 120 exchanges individual channels of the two wavelength groups supplied thereto, and outputs two wavelength-division-multiplexed optical signals. One of the output wavelength-division-multiplexed optical signals is in the form of a wavelength-division-multiplexed optical signal to be transmitted, and the other in the form of a dropped wavelength group. Both have a dispersion of 0 ps/nm.

The dropped wavelength group passes through auxiliary DCM 60 which imparts a dispersion of +300 ps/nm to the dropped signals, which then have a dispersion of +300 ps/nm. The dropped wavelength group is demultiplexed by dropped-signal DMUX 30 and received by receiver 70. Since the dispersion of the dropped channels when they are received by receiver 70 has a value of +300 ps/nm, the dropped channels are received under best conditions.

If the wavelength-division-multiplexed optical signal to be transmitted to a next optical fiber transport path should have a value of dispersion different from 0 ps/nm, then transmitting DCM 21 is put into operation.

5th Exemplary Embodiment

An optical communication apparatus according to a fifth embodiment of the present invention will be describe below with reference to FIG. 28. According to the fifth embodiment, the principles of the present invention are applied to an OADM node which employs two WSSs, each similar to the WSS described in the fourth embodiment, and an auxiliary DCM inserted into a path for a through wavelength group.

Figure 28:
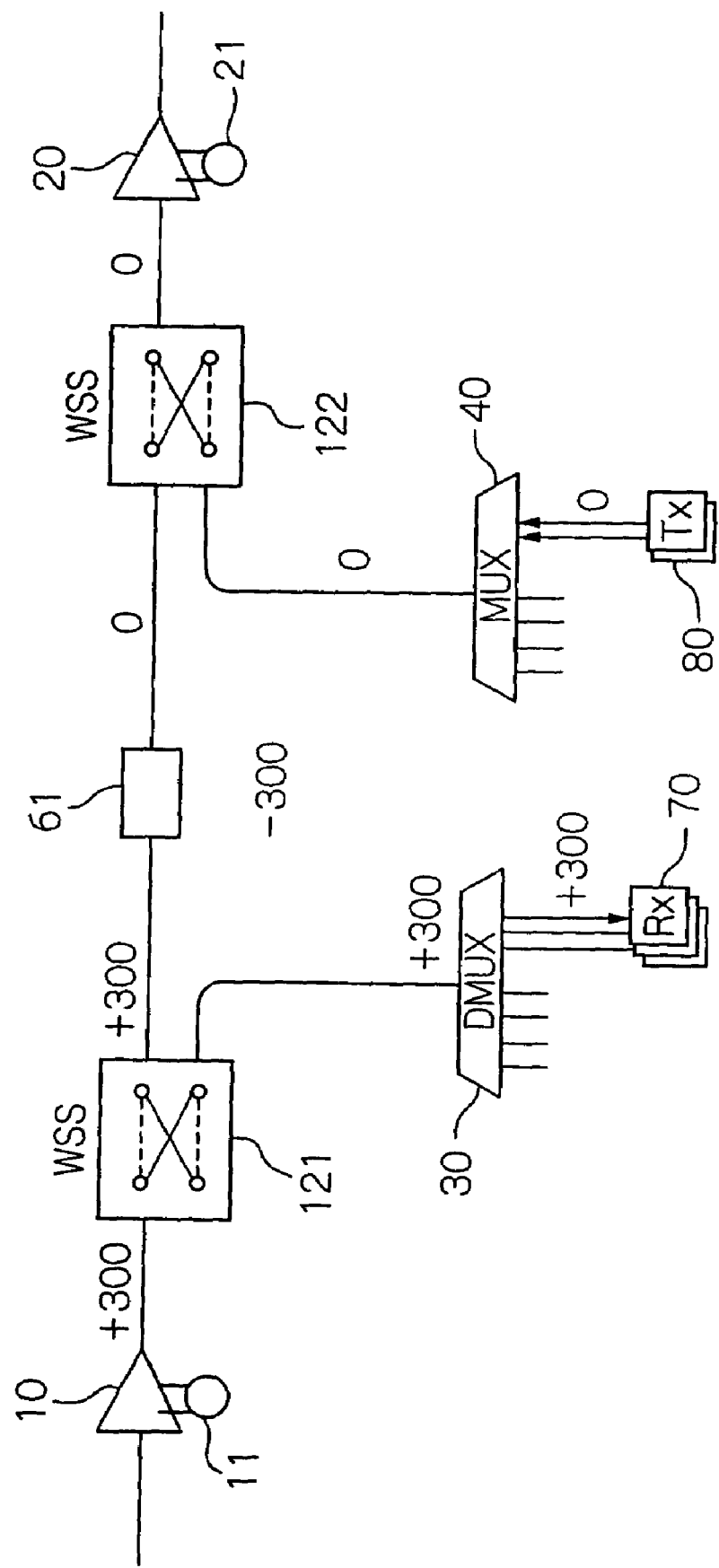
FIG. 28 is a block diagram of an OADM node according to a fifth embodiment of the present invention, which has two WSSs.

As shown in FIG. 28, the OADM node comprises receiving amplifier 10, transmitting amplifier 20, demultiplexer (DMUX) 30, multiplexer (MUX) 40, auxiliary DCM 61, receiver (Rx) 70, transmitter (Tx) 80, and two wavelength selective switches (WSSs) 121, 122. Receiving amplifier 10 is combined with receiving DCM 11, and transmitting amplifier 20 is combined with transmitting DCM 21. In the illustrated embodiment, each of WSSs 121, 122 is of a two-input, two-output configuration as with WSS 120 shown in FIGS. 26 and 27. However, WSS 121 may be of a one-input, two-output configuration, and WSSs 122 may be of a two-input, one-output configuration.

WSS 121 outputs wavelength channels as dropped signals from a wavelength-division-multiplexed optical signal whose accumulated dispersion has been adjusted by receiving DCM 11, as a wavelength-division-multiplexed optical signal in a dropped wavelength group to DMUX 30, and outputs wavelength channels as through signals from the wavelength-division-multiplexed optical signal, as a wavelength-division-multiplexed optical signal in a through wavelength group to auxiliary DCM 61.

WSS 122 combines a wavelength-division-multiplexed optical signal whose accumulated dispersion has been adjusted by auxiliary DCM 61 with a wavelength-division-multiplexed optical signal from MUX 40, and outputs a combined wavelength-division-multiplexed optical signal to transmitting amplifier 20.

Two WSSs 121, 122 make it possible to realize an arrangement in which an auxiliary DCM is provided in a path for a through wavelength group.

With the arrangement shown in FIG. 28, values of dispersion will be configured as follows:

A received wavelength-division-multiplexed optical signal is compensated for dispersion by receiving DCM 11 combined with receiving amplifier 10 such that the accumulated dispersion up to receiving amplifier 10 is canceled out and remaining dispersion has a value of +300 ps/nm. Then, the wavelength-division-multiplexed optical signal is divided into a dropped wavelength group and a through wavelength group by WSS 121.

The dropped wavelength group divided by WSS 121 is demultiplexed by dropped-signal DMUX 30 and received by receiver 70. Since the dispersion of the dropped signals when they are received by receiver 70 has a value of +300 ps/nm, the dropped channels are received under best conditions.

The through wavelength group divided by WSS 121 passes through auxiliary DCM 61 which applies a dispersion of −300 ps/nm, so that the dispersion of the through wavelength group has a value of 0 ps/nm.

Added channels from transmitter 80 are multiplexed by added-signal MUX 40, and then combined with the through channels by WSS 122, whereupon the wavelength-division multiplexing of an optical signal to be output is completed. At this time, the optical signal to be output has identical dispersions of 0 ps/nm in respective channels. If the optical signal to be output to a next optical fiber transport path should have a value of dispersion different from 0 ps/nm, then transmitting DCM 21 is put into operation.

Figure 29:
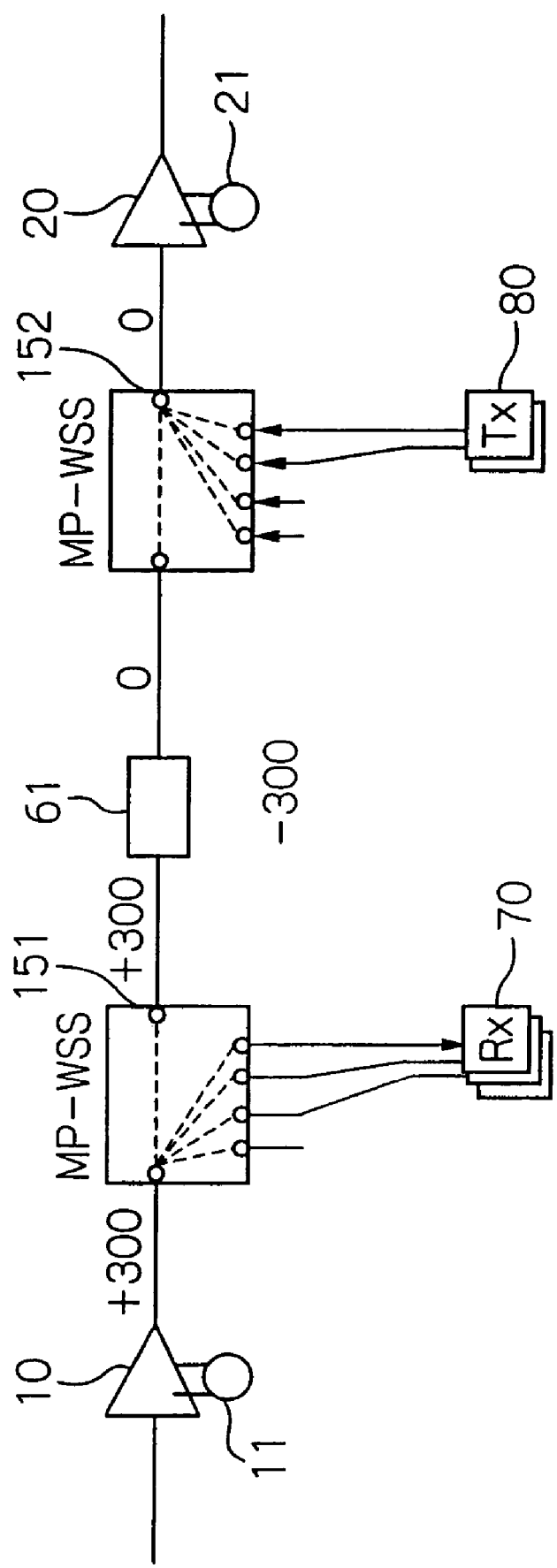
FIG. 29 is a block diagram of an OADM node according to the fifth embodiment of the present invention, which has two MP (MultiPort)—MSSs.

An arrangement according to the fifth embodiment which employs MP (MultiPort)—MSSs, rather than WSSs, is shown in FIG. 29.

An MP-MSS is a device capable of independently changing the paths of wavelength channels of a supplied wavelength-division-multiplexed optical signal and outputting optical signals in respective wavelength channels or a wavelength-division-multiplexed optical signal, or of combining a supplied wavelength-division-multiplexed optical signal with supplied optical signals in respective wavelength channels and outputting a single wavelength-division-multiplexed optical signal.

As shown in FIG. 29, an OADM node according to the fifth embodiment which employs MP-MSSs comprises receiving amplifier 10, two MP-MSSs 151, 152, auxiliary DCM 61, transmitting amplifier 20, receiver (Rx) 70, and transmitter (Tx) 80.

MP-MSS 151 is a device capable of independently changing the paths of wavelength channels of a supplied wavelength-division-multiplexed optical signal and outputting optical signals in respective wavelength channels or a wavelength-division-multiplexed optical signal. MP-MSS 151 is supplied with a wavelength-division-multiplexed optical signal whose accumulated dispersion has been adjusted by receiving DCM 11, outputs wavelength channels as dropped signals in the form of optical signals in respective wavelength channels to receiver 70, and also outputs wavelength channels as through signals in the form of a wavelength-division-multiplexed optical signal in a through wavelength group to auxiliary DCM 61.

MP-MSS 151 is supplied with a wavelength-division-multiplexed optical signal from auxiliary DCM 61, and combines the supplied wavelength-division-multiplexed optical signal with supplied optical signals in respective wavelength channels and outputs a single wavelength-division-multiplexed optical signal. Specifically, MP-MSS combines a wavelength-division-multiplexed optical signal whose accumulated dispersion has been adjusted by auxiliary DCM 61 with added signals from transmitter 80, and outputs a combined optical signal to transmitting amplifier 20.

The arrangement shown in FIG. 29 is similar to the arrangement shown in FIG. 28 except that WSS 121 and DMUX 30 shown in FIG. 28 is replaced with MP-WSS 151 and WSS 122 and MUX 40 shown in FIG. 28 is replaced with MP-WSS 152. Operation of the arrangement shown in FIG. 29 will not be described in detail below.

6th Exemplary Embodiment

Optical communication apparatus according to a sixth embodiment of the present invention will be described below. According to the sixth embodiment, the principles of the present invention are applied to an OXC (Optical Cross Connect) node which adds and drops an optical signal having a desired wavelength to and from a wavelength-division-multiplexed signal comprising a plurality of multiplexed optical signals having respective different wavelengths, and switches between paths for outputting optical signals having respective different wavelengths.

An OXC node is a device for changing the paths of multiplexed optical signals in respective wavelengths. Even though the principles of the present invention are applied to an OXC node, the concept of dispersion adjustment remains exactly the same as with the OADM nodes described above. The OADM node provides only two paths for a supplied wavelength-division-multiplexed optical signal and an output wavelength-division-multiplexed optical signal. However, the OXC node provides a plurality of pairs of paths (also referred to as ways or routes) for transmitting a wavelength-division-multiplexed optical signal to and receiving a wavelength-division-multiplexed optical signal from another node connected thereto.

Figure 30:
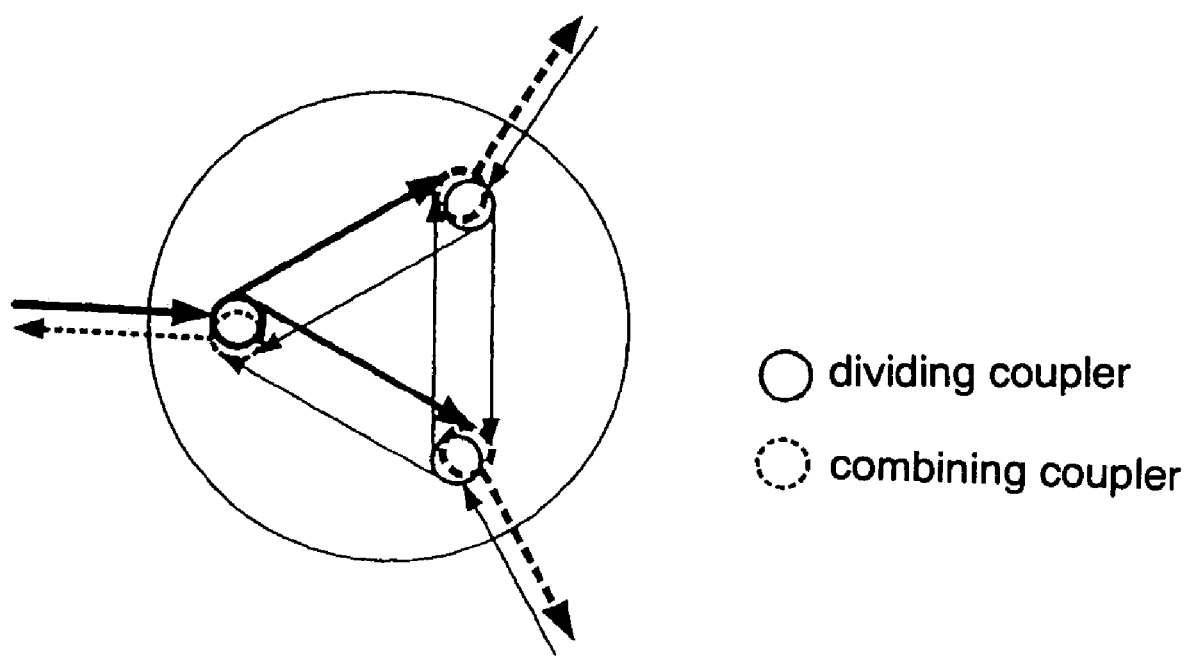
FIG. 30 is a diagram showing a general arrangement of a three-way OXC node.

A three-way OXC node having three ways or routes is illustrated in FIG. 30. The three-way OXC node has a dividing coupler and a combining coupler associated with each of the three ways or routes, for dividing a wavelength-division-multiplexed optical signal into some of the ways or routes and combining wavelength-division-multiplexed optical signals from some of the ways or routes. While an OXC code adds and drops optical signals in itself, arrows indicative of added and dropped optical signals are omitted from illustration in the three-way OXC node in FIG. 30.

Specific arrangement details of the OXC node will be described below. Since the OXC node is more complex in circuit arrangement than the OADM node described above, only part of the arrangement of the OXC node will be described below for the sake of brevity. Paths indicated by thicker solid lines in the OXC node shown in FIG. 3, i.e., paths along which a wavelength-division-multiplexed optical signal is supplied from one route and output to two routes, will be described below.

First, an OXC node in which auxiliary DCMs are provided in paths for through wavelength groups will be described below with reference to FIG. 31. Those parts shown in FIG. 31 which are identical to those shown in FIG. 23 are denoted by identical reference characters, and will not be described in detail below.

Figure 31:
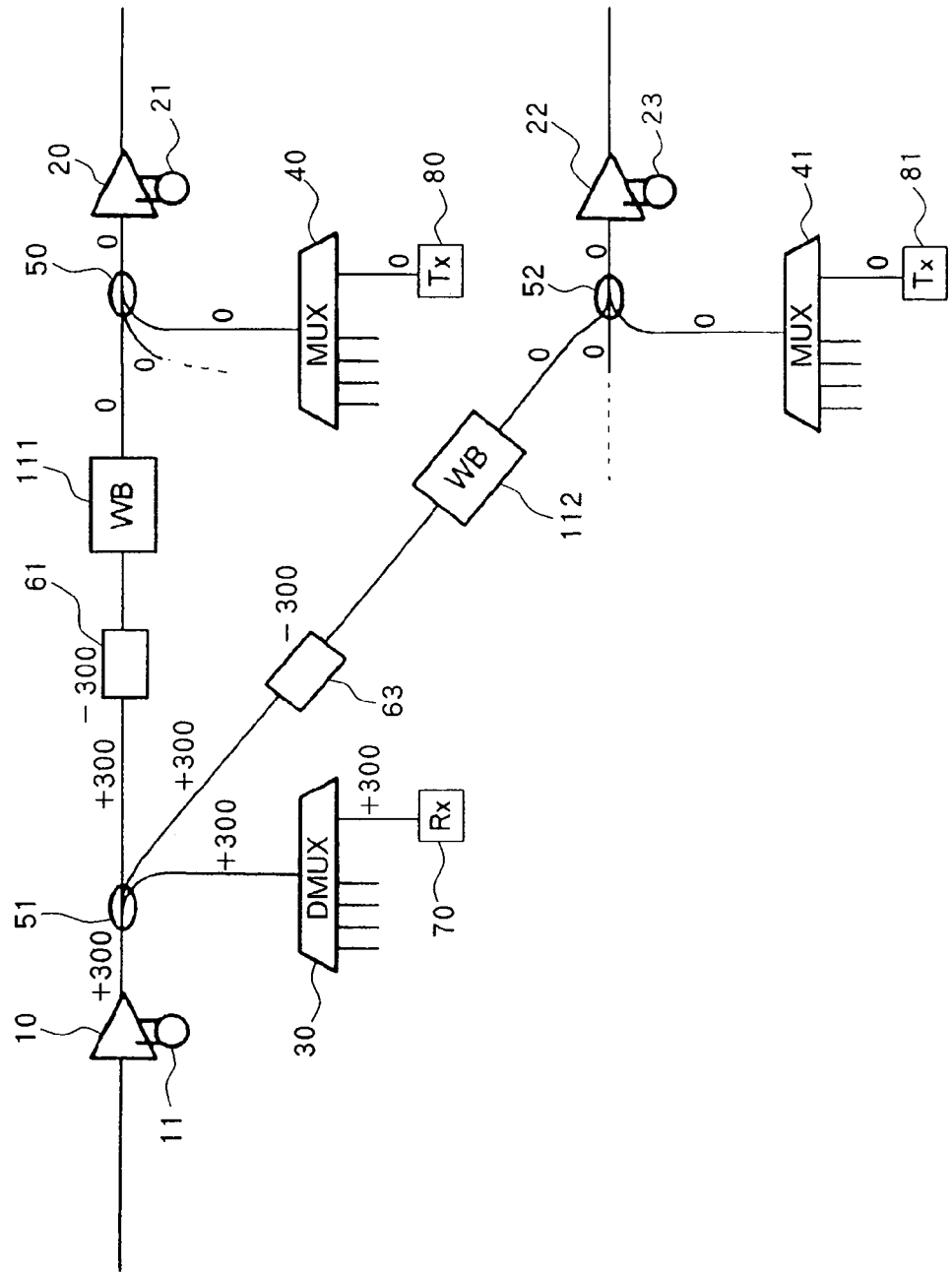
FIG. 31 is a block diagram of a portion of an OXC node according to a sixth embodiment of the present invention, which has auxiliary DCMs that are incorporated to act on through wavelength groups.

As shown in FIG. 31, the OXC node comprises receiving amplifier 10, transmitting amplifiers 20, 22, demultiplexer (DMUX) 30, multiplexers (MUXs) 40, 41, combining couplers 50, 52, dividing coupler 51, auxiliary DCMs 61, 63, receiver (Rx) 70, transmitters (Txs) 80, 81, and wavelength blockers (WBs) 111, 112. Receiving amplifier 10 is combined with receiving DCM 11, transmitting amplifier 20 with transmitting DCM 21, and transmitting amplifier 22 with transmitting DCM 23. Transmitting DCM 23 compensates for the dispersion of a wavelength-division-multiplexed optical signal output from transmitting amplifier 22.

In the OXC node, receiving amplifier 10 is supplied with a wavelength-division-multiplexed optical signal from a route, and transmitting amplifiers 20, 22 output wavelength-division-multiplexed optical signals to respective different routes.

Auxiliary DCM 61 is supplied with one of three wavelength-division-multiplexed optical signals divided by dividing coupler 51, and compensates for the dispersion of the wavelength-division-multiplexed optical signal to cancel out the accumulated dispersion adjusted by receiving DCM 11, i.e., applies a dispersion of −300 ps/nm to the wavelength-division-multiplexed optical signal. WB 111 is supplied with the wavelength-division-multiplexed optical signal whose accumulated dispersion has been adjusted by auxiliary DCM 61, and passes only optical signals in wavelength channels that are set to be output to the route to which transmitting amplifier 20 is connected.

Auxiliary DCM 63 is supplied with one of the three wavelength-division-multiplexed optical signals divided by dividing coupler 51, and compensates for the dispersion of the wavelength-division-multiplexed optical signal to cancel out the accumulated dispersion adjusted by receiving DCM 11, i.e., applies a dispersion of −300 ps/nm to the wavelength-division-multiplexed optical signal. WB 112 is supplied with the wavelength-division-multiplexed optical signal whose accumulated dispersion has been adjusted by auxiliary DCM 63, and passes only optical signals in wavelength channels that are set to be output to the route to which transmitting amplifier 22 is connected.

Combining coupler 50 combines a wavelength-division-multiplexed optical signal from MUX 40, a wavelength-division-multiplexed optical signal from WB 111, and a wavelength-division-multiplexed optical signal from a route (not shown), and outputs a combined wavelength-division-multiplexed optical signal to transmitting amplifier 20. Similarly, combining coupler 52 combines a wavelength-division-multiplexed optical signal from MUX 41, a wavelength-division-multiplexed optical signal from WB 112, and a wavelength-division-multiplexed optical signal from a route (not shown), and outputs a combined wavelength-division-multiplexed optical signal to transmitting amplifier 22.

In the arrangement shown in FIG. 31, auxiliary DCMs 61, 63 are inserted upstream of WBs 111, 112, respectively. However, auxiliary DCMs 61, 63 may be inserted downstream of WBs 111, 112, respectively.

With the arrangement shown in FIG. 31, values of dispersion will be configured as follows:

A received wavelength-division-multiplexed optical signal input from a certain route is compensated for dispersion by receiving DCM 11 combined with receiving amplifier 10 such that the accumulated dispersion up to receiving amplifier 10 is canceled out and remaining dispersion has a value of +300 ps/nm. Thereafter, the wavelength-division-multiplexed optical signal is divided into three wavelength-division-multiplexed optical signals by dividing coupler 51.

One of the three wavelength-division-multiplexed optical signals divided by dividing coupler 51 is demultiplexed by dropped-signal DMUX 30 and received by receiver 70. Since the dispersion of the dropped channels when they are received by receiver 70 has a value of +300 ps/nm, the dropped channels are received under best conditions.

Other one of the three wavelength-division-multiplexed optical signals divided by dividing coupler 51 passes through auxiliary DCM 61 which imparts a dispersion of −300 ps/nm to the wavelength-division-multiplexed optical signal, which then has a dispersion of 0 ps/nm. Thereafter, the wavelength-division-multiplexed optical signal is filtered by WB 111, which passes only optical signals in wavelength channels that are set to be output to the route to which transmitting amplifier 20 is connected. The remaining one of the three wavelength-division-multiplexed optical signals divided by dividing coupler 51 passes through auxiliary DCM 63 which imparts a dispersion of −300 ps/nm to the wavelength-division-multiplexed optical signal, which then has a dispersion of 0 ps/nm. Thereafter, the wavelength-division-multiplexed optical signal is filtered by WB 112, which passes only optical signals in wavelength channels that are set to be output to the route to which transmitting amplifier 22 is connected.

Added channels from transmitter 80 are multiplexed by added-signal MUX 40, and combined with a through signal from WB 111 and a wavelength-division-multiplexed optical signal from another route by combining coupler 50, whereupon the wavelength-division multiplexing of an optical signal to be output is completed. At this time, the optical signal to be output has identical dispersions of 0 ps/nm in respective channels. If the optical signal to be output to a next optical fiber transport path should have a value of dispersion different from 0 ps/nm, then transmitting DCM 21 is put into operation.

Added channels from transmitter 81 are multiplexed by added-signal MUX 41, and combined with a through signal from WB 112 and a wavelength-division-multiplexed optical signal from another route by combining coupler 52, whereupon the wavelength-division multiplexing of an optical signal to be output is completed. At this time, the optical signal to be output has identical dispersions of 0 ps/nm in respective channels. If the optical signal to be output to a next optical fiber transport path should have a value of dispersion different from 0 ps/nm, then transmitting DCM 23 is put into operation.

An OXC node in which auxiliary DCMs are provided in paths for added wavelength groups will be described below with reference to FIG. 32. Those parts shown in FIG. 32 which are identical to those shown in FIG. 31 are denoted by identical reference characters, and will not be described in detail below. With the arrangement shown in FIG. 32, values of dispersion will be configured as follows:

A received wavelength-division-multiplexed optical signal input from a certain route is compensated for dispersion by receiving DCM 11 combined with receiving amplifier 10 such that the accumulated dispersion up to receiving amplifier 10 is canceled out and remaining dispersion has a value of +300 ps/nm. Thereafter, the wavelength-division-multiplexed optical signal is divided into three wavelength-division-multiplexed optical signals by dividing coupler 51.

One of the three wavelength-division-multiplexed optical signals divided by dividing coupler 51 is demultiplexed by dropped-signal DMUX 30 and received by receiver 70. Since the dispersion of the dropped channels when they are received by receiver 70 has a value of +300 ps/nm, the dropped channels are received under best conditions. Operation up to this point is same as with the arrangement shown in FIG. 31.

Other one of the three wavelength-division-multiplexed optical signals divided by dividing coupler 51 is filtered by WB 111, which passes only optical signals in wavelength channels that are set to be output to the route to which transmitting amplifier 20 is connected. The remaining one of the three wavelength-division-multiplexed optical signals divided by dividing coupler 51 is filtered by WB 112, which passes only optical signals in wavelength channels that are set to be output to the route to which transmitting amplifier 22 is connected.

Added channels from transmitter 80 are multiplexed by added-signal MUX 40, and pass through auxiliary DCM 60 which imparts a dispersion of +300 ps/nm to the wavelength-division-multiplexed optical signal, which then has a dispersion of +300 ps/nm. Thereafter, the wavelength-division-multiplexed optical signal is combined with a through signal from WB 111 and a wavelength-division-multiplexed optical signal from another route by combining coupler 50, whereupon the wavelength-division multiplexing of an optical signal to be output is completed. At this time, the optical signal to be output has identical dispersions of +300 ps/nm in respective channels. If the optical signal to be output to a next optical fiber transport path should have a value of dispersion different from +300 ps/nm, then transmitting DCM 21 is put into operation.

Added channels from transmitter 81 are multiplexed by added-signal MUX 41, and pass through auxiliary DCM 62 which imparts a dispersion of +300 ps/nm to the wavelength-division-multiplexed optical signal, which then has a dispersion of +300 ps/nm. Thereafter, the wavelength-division-multiplexed optical signal is combined with a through signal from WB 112 and a wavelength-division-multiplexed optical signal from another route by combining coupler 52, whereupon the wavelength-division multiplexing of an optical signal to be output is completed. At this time, the optical signal to be output has identical dispersions of +300 ps/nm in respective channels. If the optical signal to be output to a next optical fiber transport path should have a value of dispersion different from +300 ps/nm, then transmitting DCM 23 is put into operation.

An OXC node in which an auxiliary DCM is provided in a path for a dropped wavelength group will be described below with reference to FIG. 33. Those parts shown in FIG. 33 which are identical to those shown in FIG. 31 are denoted by identical reference characters, and will not be described in detail below. With the arrangement shown in FIG. 33, values of dispersion will be configured as follows:

A received wavelength-division-multiplexed optical signal input from a certain route is compensated for dispersion by receiving DCM 11 combined with receiving amplifier 10 such that the accumulated dispersion up to receiving amplifier 10 is canceled out and remaining dispersion has a value of 0 ps/nm. Thereafter, the wavelength-division-multiplexed optical signal is divided into three wavelength-division-multiplexed optical signals by dividing coupler 51.

One of the three wavelength-division-multiplexed optical signals divided by dividing coupler 51 passes through auxiliary DCM 60 which imparts a dispersion of +300 ps/nm to the wavelength-division-multiplexed optical signal, which then has a dispersion of +300 ps/nm. The wavelength-division-multiplexed optical signal is demultiplexed by dropped-signal DMUX 30 and received by receiver 70. Since the dispersion of the dropped channels when they are received by receiver 70 has a value of +300 ps/nm, the dropped channels are received under best conditions.

Other one of the three wavelength-division-multiplexed optical signals divided by dividing coupler 51 is filtered by WB 111, which passes only optical signals in wavelength channels that are set to be output to the route to which transmitting amplifier 20 is connected. The remaining one of the three wavelength-division-multiplexed optical signals divided by dividing coupler 51 is filtered by WB 112, which passes only optical signals in wavelength channels that are set to be output to the route to which transmitting amplifier 22 is connected.

Added channels from transmitter 80 are multiplexed by added-signal MUX 40, and combined with a through signal from WB 111 and a wavelength-division-multiplexed optical signal from another route by combining coupler 50, whereupon the wavelength-division multiplexing of an optical signal to be output is completed. At this time, the optical signal to be output has identical dispersions of 0 ps/nm in respective channels. If the optical signal to be output to a next optical fiber transport path should have a value of dispersion different from 0 ps/nm, then transmitting DCM 21 is put into operation.

Added channels from transmitter 81 are multiplexed by added-signal MUX 41, and combined with a through signal from WB 112 and a wavelength-division-multiplexed optical signal from another route by combining coupler 52, whereupon the wavelength-division multiplexing of an optical signal to be output is completed. At this time, the optical signal to be output has identical dispersions of 0 ps/nm in respective channels. If the optical signal to be output to a next optical fiber transport path should have a value of dispersion different from 0 ps/nm, then transmitting DCM 23 is put into operation.

Figure 32:
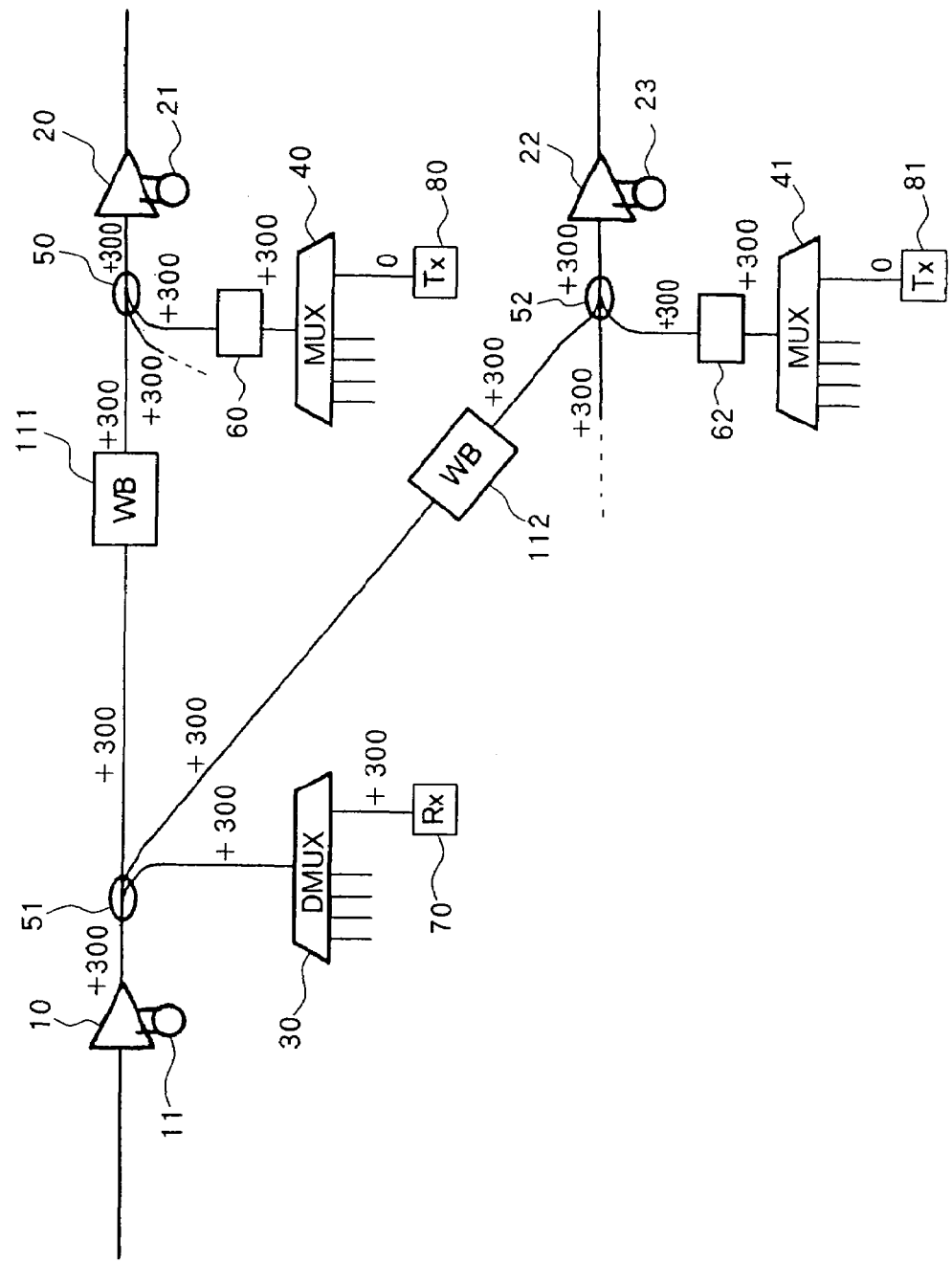
FIG. 32 is a block diagram of a portion of an OXC node according to the sixth embodiment of the present invention, which has auxiliary DCMs that are incorporated to act on added wavelength groups.
Figure 33:
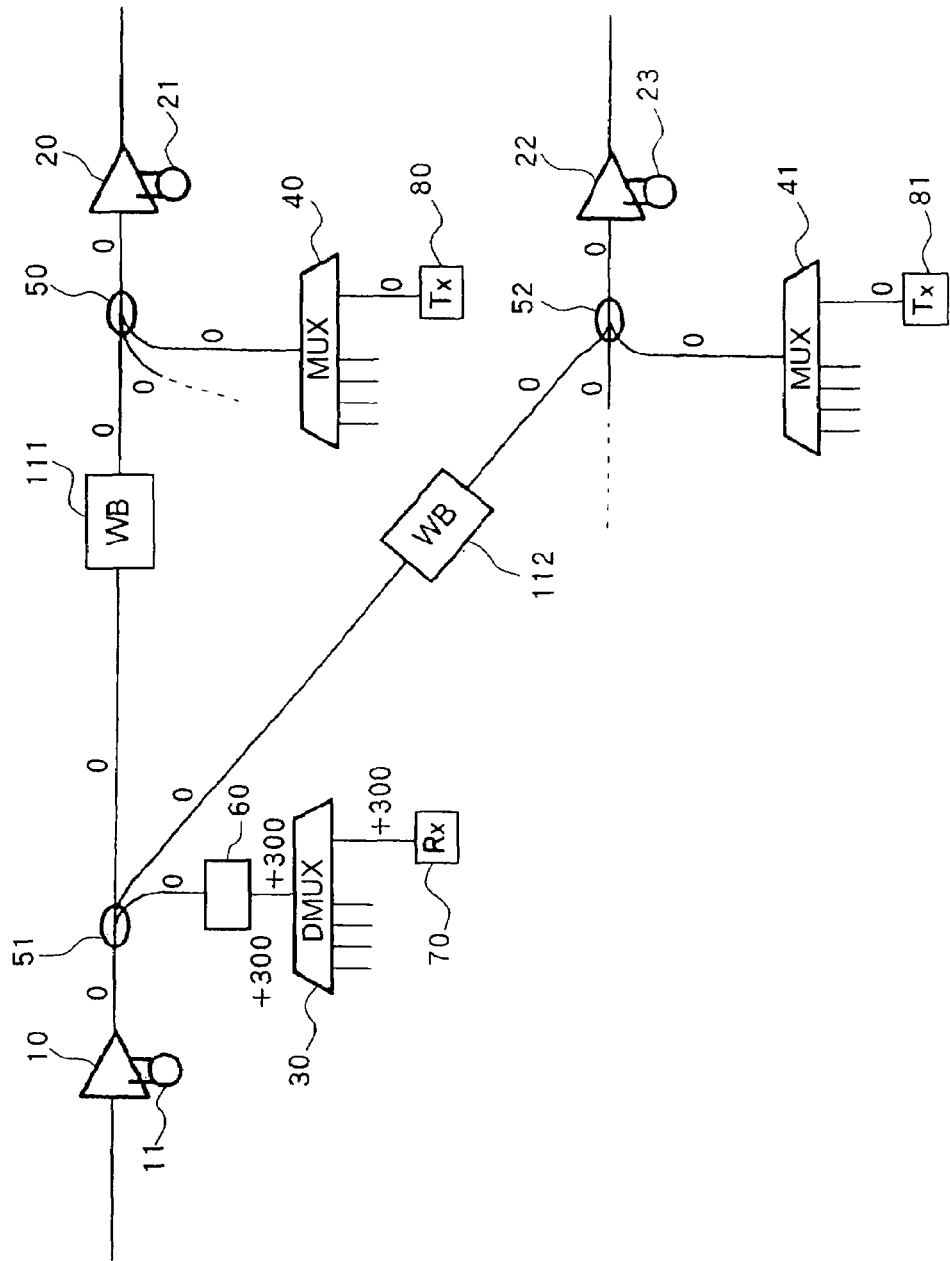
FIG. 33 is a block diagram of a portion of an OXC node according to the sixth embodiment of the present invention, which has an auxiliary DCM that is incorporated to act on a dropped wavelength group.

With either one of the arrangements shown in FIGS. 31 through 33, it is possible to set the accumulated dispersion of optical signals to +300 ps/nm when they are received by receiver 70 and also to equalize the values of dispersion in the wavelength channels of added and through signals.

Figure 34:
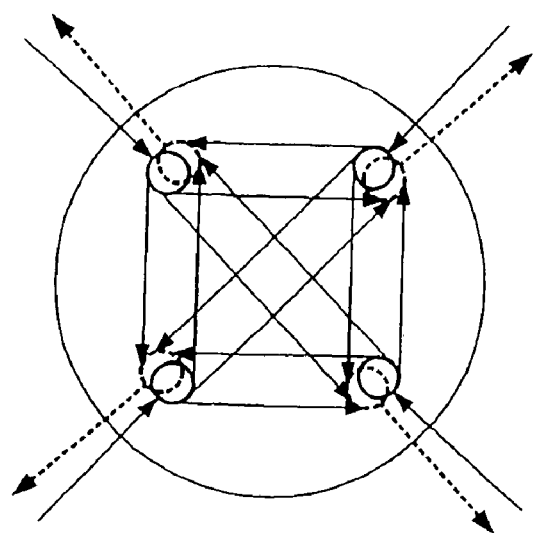
FIG. 34 is a diagram showing a general arrangement of a four-way OXC node.
Figure 35:
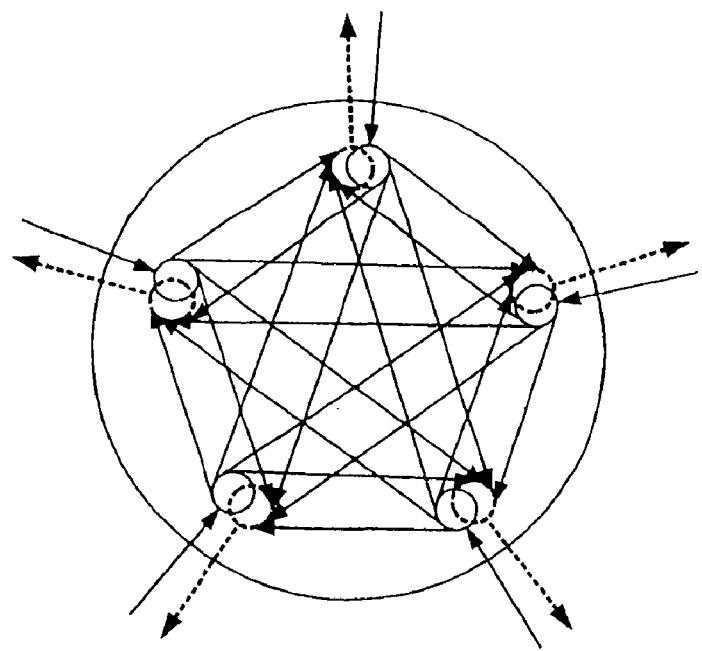
FIG. 35 is a diagram showing a general arrangement of a five-way OXC node.

According to the sixth embodiment, the principles of the present invention are applied to the three-way OXC node. However, the principles of the present invention are also applicable to a four-way OXC node as shown in FIG. 34 or a five-way OXC node as shown in FIG. 35.

In the first through sixth embodiments, the bit error rate in receiver 70 is minimum when the accumulated dispersion has a value of +300 ps/nm. However, the principles of the present invention are also applicable if the bit error rate is minimum when the accumulated dispersion has a value other than zero.

In the first through sixth embodiments, the optical communication apparatus comprises an OADM node or an OXC node. However, the principles of the present invention are also applicable to any optical communication apparatus which can drop, add, or pass an optical signal having a desired wavelength to, from, and through a wavelength-division-multiplexed signal.

In the first through sixth embodiments, when a certain frequency channel is extracted or dropped from a node, it is dropped from the node and will not be transferred to a next node. However, the principles of the present invention are also applicable to an optical communication apparatus which performs a drop-and-continue function to extract or drop a certain frequency channel and also transfer that frequency channel to a next node.

The present invention is based on the premise that the accumulated dispersion has an optimum value other than zero. If the accumulated dispersion has an optimum value of zero, then the conventional arrangements are capable of receiving an optical signal optimally. Therefore, the present invention is limited to applications where the accumulated dispersion has an optimum value other than zero.

While preferred embodiments of the present invention have been described using specific terms, such description is for illustrative purposes only, and it is to be understood that changes and variations may be made without departing from the spirit or scope of the following claims.

What is claimed is:

1. An optical communication apparatus for adding and dropping an optical signal from a wavelength-division-multiplexed optical signal, comprising:
   a receiving dispersion compensating module for adjusting the accumulated dispersion of the wavelength-division-multiplexed signal such that the accumulated dispersion has an optimum value at a receiver for receiving optical signals in respective wavelength channels which are dropped from the wavelength-division-multiplexed optical signal;
   a demultiplexing unit for demultiplexing the wavelength-division-multiplexed optical signal whose accumulated dispersion has been adjusted by said receiving dispersion compensating module, into a wavelength-division-multiplexed optical signal in a through wavelength group to pass though the optical communication apparatus and a wavelength-division-multiplexed optical signal in a dropped wavelength group to be dropped from the optical communication apparatus;
   an auxiliary dispersion compensating module for applying the same value of dispersion as the value of accumulated dispersion adjusted by said receiving dispersion compensating module, to a wavelength-division-multiplexed optical signal in an added wavelength group representative of signals to be added; and
   a multiplexing unit for combining the wavelength-division-multiplexed optical signal in the through wavelength group and the wavelength-division-multiplexed optical signal in the added wavelength group whose accumulated dispersion has been adjusted by said auxiliary dispersion compensating module, into an output optical signal.

2. An optical communication apparatus according to claim 1, wherein said demultiplexing unit and said multiplexing unit are realized by:
   a wavelength selective switch for independently changing the paths of wavelength channels of a supplied wavelength-division-multiplexed optical signal, outputting wavelength channels to be dropped as a wavelength-division-multiplexed optical signal in a dropped wavelength group from the wavelength-division-multiplexed optical signal whose accumulated dispersion has been adjusted by said receiving dispersion compensating module, and combining wavelength channels to pass as through signals from the wavelength-division-multiplexed optical signal whose accumulated dispersion has been adjusted by said receiving dispersion compensating module, with the wavelength-division-multiplexed optical signal whose accumulated dispersion has been adjusted by said auxiliary dispersion compensating module, into an output optical signal and outputting the output optical signal.

3. An optical communication apparatus for adding and dropping an optical signal from a wavelength-division-multiplexed optical signal, comprising:
   a receiving dispersion compensating module for adjusting the accumulated dispersion of the wavelength-division-multiplexed signal such that the accumulated dispersion has an optimum value at a receiver for receiving optical signals in respective wavelength channels which are dropped from the wavelength-division-multiplexed optical signal;
   a demultiplexing unit for demultiplexing the wavelength-division-multiplexed optical signal whose accumulated dispersion has been adjusted by said receiving dispersion compensating module, into a wavelength-divisionmultiplexed optical signal in a through wavelength group to pass through the optical communication apparatus and a wavelength-division-multiplexed optical signal in a dropped wavelength group to be dropped from the optical communication apparatus;

an auxiliary dispersion compensating module for adjusting the accumulated dispersion of the wavelength-division-multiplexed optical signal in the through wavelength group by canceling out the value of accumulated dispersion adjusted by said receiving dispersion compensating module; and a multiplexing unit for combining the wavelength-division-multiplexed optical signal in the through wavelength group whose accumulated dispersion has been adjusted by said auxiliary dispersion compensating module and a wavelength-division-multiplexed optical signal in an added wavelength group representative of signals to be added, into an output optical signal.

4. An optical communication apparatus according to claim 3, wherein said demultiplexing unit is realized by:

a first wavelength selective switch for independently changing the paths of wavelength channels of a supplied wavelength-division-multiplexed optical signal, outputting wavelength channels to be dropped as a wavelength-division-multiplexed optical signal in a dropped wavelength group from the wavelength-division-multiplexed optical signal whose accumulated dispersion has been adjusted by said receiving dispersion compensating module, and outputting wavelength channels to pass as through signals from the wavelength-division-multiplexed optical signal whose accumulated dispersion has been adjusted by said receiving dispersion compensating module, as a wavelength-division-multiplexed optical signal in a through wavelength group; and said multiplexing unit is realized by a second wavelength selective switch for independently changing the paths of wavelength channels of a supplied wavelength-division-multiplexed optical signal, and combining the wavelength-division-multiplexed optical signal whose accumulated dispersion has been adjusted by said auxiliary dispersion compensating module and a wavelength-division-multiplexed optical signal from said multiplexer, into an output optical signal, and outputting the output optical signal.

5. An optical communication apparatus for adding and dropping an optical signal from a wavelength-division-multiplexed optical signal, comprising:

a receiving dispersion compensating module for adjusting the accumulated dispersion of the wavelength-division-multiplexed signal such that the accumulated dispersion has a value of zero;

a demultiplexing unit for demultiplexing the wavelength-division-multiplexed optical signal whose accumulated dispersion has been adjusted by said receiving dispersion compensating module, into a wavelength-division-multiplexed optical signal in a through wavelength group to pass through the optical communication apparatus and a wavelength-division-multiplexed optical signal in a dropped wavelength group to be dropped from the optical communication apparatus;

an auxiliary dispersion compensating module for adjusting the accumulated dispersion of the wavelength-division-multiplexed optical signal in the dropped wavelength group such that the accumulated dispersion has an optimum value at a receiver for receiving optical signals in respective wavelength channels which are dropped from the wavelength-division-multiplexed optical signal; and a multiplexing unit for combining the wavelength-division-multiplexed optical signal in the through wavelength group and a wavelength-division-multiplexed optical signal in an added wavelength group representative of signals to be added, into an output optical signal.

6. An optical communication apparatus according to claim 5, wherein said demultiplexing unit and said multiplexing unit are realized by:

a wavelength selective switch for independently changing the paths of wavelength channels of a supplied wavelength-division-multiplexed optical signal, outputting wavelength channels to be dropped as a wavelength-division-multiplexed optical signal in a dropped wavelength group from the wavelength-division-multiplexed optical signal whose accumulated dispersion has been adjusted by said receiving dispersion compensating module, and combining wavelength channels to pass as through signals from the wavelength-division-multiplexed optical signal whose accumulated dispersion has been adjusted by said receiving dispersion compensating module, with a wavelength-division-multiplexed optical signal from said multiplexer, into an output optical signal and outputting the output optical signal.

7. An optical communication apparatus for adding and dropping an optical signal from a wavelength-division-multiplexed optical signal, comprising:

a plurality of receivers for receiving respective optical signals in respective wavelength channels which are dropped from the wavelength-division-multiplexed optical signal;

a receiving dispersion compensating module for adjusting the accumulated dispersion of the wavelength-division-multiplexed signal such that the accumulated dispersion has an optimum value at said receivers;

a demultiplexer for demultiplexing the wavelength-division-multiplexed signal whose accumulated dispersion has been adjusted by said receiving dispersion compensating module into optical signals having respective wavelengths;

a first multiplexer for multiplexing through signals of the optical signals from said demultiplexer;

a plurality of transmitters for outputting signals to be added;

a second multiplexer for multiplexing the signals to be added from said transmitters;

an auxiliary dispersion compensating module for applying the same value of dispersion as the value of accumulated dispersion adjusted by said receiving dispersion compensating module, to a wavelength-division-multiplexed optical signal from said second multiplexer; and a combining coupler for combining a wavelength-division-multiplexed optical signal from said first multiplexer and the wavelength-division-multiplexed optical signal whose accumulated dispersion has been adjusted by said auxiliary dispersion compensating module, into an output optical signal.

8. An optical communication apparatus for adding and dropping an optical signal from a wavelength-division-multiplexed optical signal, comprising:

a plurality of receivers for receiving respective optical signals in respective wavelength channels which are dropped from the wavelength-division-multiplexed optical signal;

a receiving dispersion compensating module for adjusting the accumulated dispersion of the wavelength-division-multiplexed signal such that the accumulated dispersion has an optimum value at said receivers;

a demultiplexer for demultiplexing the wavelength-division-multiplexed signal whose accumulated dispersion has been adjusted by said receiving dispersion compensating module into optical signals having respective wavelengths;

a first multiplexer for multiplexing through signals of the optical signals from said demultiplexer;

a plurality of transmitters for outputting signals to be added;

a second multiplexer for multiplexing the signals to be added from said transmitters;

an auxiliary dispersion compensating module for adjusting the accumulated dispersion of the wavelength-division-multiplexed optical signal from said first multiplexer by canceling out the value of accumulated dispersion adjusted by said receiving dispersion compensating module; and a combining coupler for combining the wavelength-division-multiplexed optical signal whose accumulated dispersion has been adjusted by said auxiliary dispersion compensating module and a wavelength-division-multiplexed optical signal from said second multiplexer, into an output optical signal.

9. An optical communication apparatus for adding and dropping an optical signal from a wavelength-division-multiplexed optical signal, comprising:

a receiving dispersion compensating module for adjusting the accumulated dispersion of the wavelength-division-multiplexed signal such that the accumulated dispersion has a value of zero;

a first demultiplexer for demultiplexing the wavelength-division-multiplexed signal whose accumulated dispersion has been adjusted by said receiving dispersion compensating module into optical signals having respective wavelengths;

a dividing coupler for dividing the wavelength-division-multiplexed signal whose accumulated dispersion has been adjusted by said receiving dispersion compensating module;

a plurality of receivers for receiving the respective optical signals in the respective wavelength channels which are dropped from the wavelength-division-multiplexed optical signal;

an auxiliary dispersion compensating module for adjusting the accumulated dispersion of a wavelength-division-multiplexed optical signal divided by said dividing coupler such that the accumulated dispersion has an optimum value at said receivers;

a second demultiplexer for demultiplexing the wavelength-division-multiplexed signal whose accumulated dispersion has been adjusted by said receiving dispersion compensating module;

a plurality of transmitters for outputting signals to be added; and a multiplexer for multiplexing through signals of the optical signals demultiplexed by said first demultiplexer and the signals to be added from said transmitters, into an output optical signal.

10. An optical communication apparatus for adding and dropping an optical signal from a wavelength-division-multiplexed optical signal, comprising:

a plurality of receivers for receiving respective optical signals in respective wavelength channels which are dropped from the wavelength-division-multiplexed optical signal;

a receiving dispersion compensating module for adjusting the accumulated dispersion of the wavelength-division-multiplexed signal such that the accumulated dispersion has an optimum value at said receivers;

an auxiliary dispersion compensating module for adjusting the accumulated dispersion of the wavelength-division-multiplexed optical signal which has been compensated for by said receiving dispersion compensating module by canceling out the value of accumulated dispersion adjusted by said receiving dispersion compensating module;

a first demultiplexer for demultiplexing the wavelength-division-multiplexed signal whose accumulated dispersion has been compensated for by said auxiliary dispersion compensating module;

a dividing coupler for dividing the wavelength-division-multiplexed signal whose accumulated dispersion has been adjusted by said receiving dispersion compensating module;

a second demultiplexer for demultiplexing a wavelength-division-multiplexed signal divided by said dividing coupler;

a plurality of transmitters for outputting signals to be added; and a multiplexer for multiplexing through signals of the optical signals demultiplexed by said first demultiplexer and the signals to be added from said transmitters, into an output optical signal.

11. An optical communication apparatus for adding and dropping an optical signal from a wavelength-division-multiplexed optical signal, comprising:

a plurality of receivers for receiving respective optical signals in respective wavelength channels which are dropped from the wavelength-division-multiplexed optical signal;

a receiving dispersion compensating module for adjusting the accumulated dispersion of the wavelength-division-multiplexed signal such that the accumulated dispersion has an optimum value at said receivers;

a dividing coupler for dividing the wavelength-division-multiplexed signal whose accumulated dispersion has been adjusted by said receiving dispersion compensating module;

a demultiplexer for demultiplexing a wavelength-division-multiplexed signal divided by said dividing coupler into optical signals having respective wavelengths;

a wavelength blocker for passing only wavelength channels as through signals from the wavelength-division-multiplexed signal whose accumulated dispersion has been adjusted by said receiving dispersion compensating module;

an auxiliary dispersion compensating module for adjusting the accumulated dispersion of a wavelength-division-multiplexed optical signal from said wavelength blocker by canceling out the accumulated dispersion adjusted by said receiving dispersion compensating module;

a plurality of transmitters for outputting signals to be added;

a multiplexer for multiplexing the signals to be added from said transmitters; and a combining coupler for combining the wavelength-division-multiplexed optical signal whose accumulated dispersion has been adjusted by said auxiliary dispersion compensating module and a wavelength-division-multiplexed optical signal from said multiplexer, into an output optical signal.

12. An optical communication apparatus for adding and dropping an optical signal from a wavelength-division-multiplexed optical signal, comprising:

a plurality of receivers for receiving respective optical signals in respective wavelength channels which are dropped from the wavelength-division-multiplexed optical signal;
a receiving dispersion compensating module for adjusting the accumulated dispersion of the wavelength-division-multiplexed signal such that the accumulated dispersion has an optimum value at said receivers;
a dividing coupler for dividing the wavelength-division-multiplexed signal whose accumulated dispersion has been adjusted by said receiving dispersion compensating module;
a demultiplexer for demultiplexing a wavelength-division-multiplexed signal divided by said dividing coupler into optical signals having respective wavelengths;
a wavelength blocker for passing only wavelength channels as through signals from the wavelength-division-multiplexed signal whose accumulated dispersion has been adjusted by said receiving dispersion compensating module;
a plurality of transmitters for outputting signals to be added;
a multiplexer for multiplexing the signals to be added from said transmitters;
an auxiliary dispersion compensating module for applying the same value of dispersion as the value of accumulated dispersion adjusted by said receiving dispersion compensating module, to a wavelength-division-multiplexed optical signal from said multiplexer; and
a combining coupler for combining a wavelength-division-multiplexed optical signal from said wavelength blocker and the wavelength-division-multiplexed optical signal from said auxiliary dispersion compensating module, into an output optical signal.

13. An optical communication apparatus for adding and dropping an optical signal from a wavelength-division-multiplexed optical signal, comprising:
a receiving dispersion compensating module for adjusting the accumulated dispersion of the wavelength-division-multiplexed signal such that the accumulated dispersion has a value of zero;
a dividing coupler for dividing the wavelength-division-multiplexed signal whose accumulated dispersion has been adjusted by said receiving dispersion compensating module;
a plurality of receivers for receiving respective optical signals in respective wavelength channels which are dropped from the wavelength-division-multiplexed optical signal;
an auxiliary dispersion compensating module for adjusting the accumulated dispersion of a wavelength-division-multiplexed optical signal divided by said dividing coupler such that the accumulated dispersion has an optimum value at said receivers;
a demultiplexer for demultiplexing the wavelength-division-multiplexed signal whose accumulated dispersion has been adjusted by said auxiliary dispersion compensating module;
a wavelength blocker for passing only wavelength channels as through signals from the wavelength-division-multiplexed signal whose accumulated dispersion has been adjusted by said receiving dispersion compensating module;
a plurality of transmitters for outputting signals to be added;
a multiplexer for multiplexing the signals to be added from said transmitters; and
a combining coupler for combining a wavelength-division-multiplexed optical signal from said wavelength blocker and a wavelength-division-multiplexed optical signal from said multiplexer, into an output optical signal.

14. An optical communication apparatus for adding and dropping an optical signal from a wavelength-division-multiplexed optical signal, comprising:
a plurality of receivers for receiving respective optical signals in respective wavelength channels which are dropped from the wavelength-division-multiplexed optical signal;
a receiving dispersion compensating module for adjusting the accumulated dispersion of the wavelength-division-multiplexed signal such that the accumulated dispersion has an optimum value at said receivers;
a first multiport wavelength selective switch for independently changing the paths of wavelength channels of a supplied wavelength-division-multiplexed optical signal to output optical signals in respective wavelength channels or a wavelength-division-multiplexed optical signal, being supplied with the wavelength-division-multiplexed optical signal whose accumulated dispersion has been adjusted by said receiving dispersion compensating module, outputting wavelength channels to be dropped as optical signals in respective wavelength channels, and outputting wavelength channels to pass as through signals as a wavelength-division-multiplexed optical signal in a through wavelength group;
an auxiliary dispersion compensating module for adjusting the accumulated dispersion of the wavelength-division-multiplexed optical signal in the through wavelength group from said first multiport wavelength selective switch by canceling out the accumulated dispersion adjusted by said receiving dispersion compensating module;
a plurality of transmitters for outputting signals to be added; and
a second multiport wavelength selective switch for combining a supplied wavelength-division-multiplexed optical signal with supplied optical signals in respective wavelength channels, combining the wavelength-division-multiplexed optical signal whose accumulated dispersion has been adjusted by said auxiliary dispersion compensating module and the signals to be added from said transmitters into an output optical signal, and outputting the output optical signal.

15. An optical communication apparatus for adding and dropping an optical signal from a wavelength-division-multiplexed optical signal, comprising:
a plurality of receivers for receiving respective optical signals in respective wavelength channels which are dropped from the wavelength-division-multiplexed optical signal;
a receiving dispersion compensating module for adjusting the accumulated dispersion of the wavelength-division-multiplexed signal supplied from a route such that the accumulated dispersion has an optimum value at said receivers;
a dividing coupler for dividing the wavelength-division-multiplexed signal whose accumulated dispersion has been adjusted by said receiving dispersion compensating module;
a demultiplexer for demultiplexing a wavelength-division-multiplexed signal divided by said dividing coupler into optical signals having respective wavelengths;
a first wavelength blocker for passing only wavelength channels which are set to be output to a first one of said routes, from the wavelength-division-multiplexed signal which has been divided by said dividing coupler;
a first auxiliary dispersion compensating module for adjusting the accumulated dispersion of a wavelength-division-multiplexed optical signal from said first wavelength blocker by canceling out the accumulated dispersion adjusted by said receiving dispersion compensating module;
a second wavelength blocker for passing only wavelength channels which are set to be output to a second one of said routes, from the wavelength-division-multiplexed signal which has been divided by said dividing coupler;
a second auxiliary dispersion compensating module for adjusting the accumulated dispersion of a wavelength-division-multiplexed optical signal from said second wavelength blocker by canceling out the accumulated dispersion adjusted by said receiving dispersion compensating module;
a plurality of first transmitters for outputting signals to be added;
a plurality of second transmitters for outputting signals to be added;
a first multiplexer for multiplexing the signals to be added from said first transmitters;
a second multiplexer for multiplexing the signals to be added from said second transmitters;
a first combining coupler for combining the wavelength-division-multiplexed optical signal whose accumulated dispersion has been adjusted by said first auxiliary dispersion compensating module, a wavelength-division-multiplexed optical from another route, and a wavelength-division-multiplexed optical from said first multiplexer, into a first output optical signal; and
a second combining coupler for combining the wavelength-division-multiplexed optical signal whose accumulated dispersion has been adjusted by said second auxiliary dispersion compensating module, a wavelength-division-multiplexed optical from another route, and a wavelength-division-multiplexed optical from said second multiplexer, into a second output optical signal.

16. An optical communication apparatus for adding and dropping an optical signal from a wavelength-division-multiplexed optical signal, comprising:
a plurality of receivers for receiving respective optical signals in respective wavelength channels which are dropped from the wavelength-division-multiplexed optical signal;
a receiving dispersion compensating module for adjusting the accumulated dispersion of the wavelength-division-multiplexed signal supplied from a route such that the accumulated dispersion has an optimum value at said receivers;
a dividing coupler for dividing the wavelength-division-multiplexed signal whose accumulated dispersion has been adjusted by said receiving dispersion compensating module;
a demultiplexer for demultiplexing a wavelength-division-multiplexed signal divided by said dividing coupler into optical signals having respective wavelengths;
a first wavelength blocker for passing only wavelength channels which are set to be output to a first one of said routes, from the wavelength-division-multiplexed signal which has been divided by said dividing coupler;
a second wavelength blocker for passing only wavelength channels which are set to be output to a second one of said routes, from the wavelength-division-multiplexed signal which has been divided by said dividing coupler;
a plurality of first transmitters for outputting signals to be added;
a first multiplexer for multiplexing the signals to be added from said first transmitters;
a first auxiliary dispersion compensating module for applying the same value of dispersion as the accumulated dispersion adjusted by said receiving dispersion compensating module to a wavelength-division-multiplexed optical signal from said first multiplexer;
a plurality of second transmitters for outputting signals to be added;
a second multiplexer for multiplexing the signals to be added from said second transmitters;
a second auxiliary dispersion compensating module for applying the same value of dispersion as the accumulated dispersion adjusted by said receiving dispersion compensating module to a wavelength-division-multiplexed optical signal from said second multiplexer;
a first combining coupler for combining a wavelength-division-multiplexed optical signal from said first wavelength blocker, a wavelength-division-multiplexed optical from another route, and the wavelength-division-multiplexed optical whose accumulated dispersion has been adjusted by said first auxiliary dispersion compensating module, into a first output optical signal; and
a second combining coupler for combining a wavelength-division-multiplexed optical signal from said second wavelength blocker, a wavelength-division-multiplexed optical from another route, and the wavelength-division-multiplexed optical whose accumulated dispersion has been adjusted by said second auxiliary dispersion compensating module, into a second output optical signal.

17. An optical communication apparatus for adding and dropping an optical signal from a wavelength-division-multiplexed optical signal, comprising:
a receiving dispersion compensating module for adjusting the accumulated dispersion of a wavelength-division-multiplexed signal supplied from a route such that the accumulated dispersion has a value of zero;
a dividing coupler for dividing the wavelength-division-multiplexed signal whose accumulated dispersion has been adjusted by said receiving dispersion compensating module;
a plurality of receivers for receiving respective optical signals in respective wavelength channels which are dropped from the wavelength-division-multiplexed optical signal;
an auxiliary dispersion compensating module for adjusting the accumulated dispersion of a wavelength-division-multiplexed optical signal divided by said dividing coupler such that the accumulated dispersion has an optimum value at said receivers;
a demultiplexer for demultiplexing the wavelength-division-multiplexed signal whose accumulated dispersion has been adjusted by said auxiliary dispersion compensating module, into optical signals having respective wavelengths;
a first wavelength blocker for passing only wavelength channels which are set to be output to a first one of said routes, from the wavelength-division-multiplexed signal which has been divided by said dividing coupler;
a second wavelength blocker for passing only wavelength channels which are set to be output to a second one of said routes, from the wavelength-division-multiplexed signal which has been divided by said dividing coupler;

a plurality of first transmitters for outputting signals to be added;

a plurality of second transmitters for outputting signals to be added;

a first multiplexer for multiplexing the signals to be added from said first transmitters;

a second multiplexer for multiplexing the signals to be added from said second transmitters;

a first combining coupler for combining a wavelength-division-multiplexed optical signal from said first wavelength blocker, a wavelength-division-multiplexed optical from another route, and a wavelength-division-multiplexed optical from said first multiplexer, into a first output optical signal; and a second combining coupler for combining a wavelength-division-multiplexed optical signal from said second wavelength blocker, a wavelength-division-multiplexed optical from another route, and a wavelength-division-multiplexed optical from said multiplexer, into a second output optical signal.

* * * * *